US011399073B2

(12) United States Patent
Zmijewski et al.

(10) Patent No.: US 11,399,073 B2
(45) Date of Patent: Jul. 26, 2022

(54) METHODS, SYSTEMS, AND APPARATUS FOR GEOGRAPHIC LOCATION USING TRACE ROUTES

(71) Applicant: Dynamic Network Services, Inc., Redwood Shores, CA (US)

(72) Inventors: Earl Edward Zmijewski, West Lebanon, NH (US); Thomas Lee Tysinger, Norwich, VT (US); Douglas Carl Madory, Lebanon, NH (US)

(73) Assignee: Dynamic Network Services. Inc., Redwood Shores, CA (US)

(*) Notice: Subject to any disclaimer, the term of this patent is extended or adjusted under 35 U.S.C. 154(b) by 63 days.

(21) Appl. No.: 16/912,505

(22) Filed: Jun. 25, 2020

(65) Prior Publication Data

US 2020/0389535 A1 Dec. 10, 2020

Related U.S. Application Data

(63) Continuation of application No. 15/746,598, filed as application No. PCT/US2016/043328 on Jul. 21, 2016, now Pat. No. 10,742,752.
(Continued)

(51) Int. Cl.
*H04L 67/52* (2022.01)
*H04L 101/69* (2022.01)
(Continued)

(52) U.S. Cl.
CPC .......... *H04L 67/18* (2013.01); *H04L 43/0823* (2013.01); *H04L 43/0852* (2013.01);
(Continued)

(58) Field of Classification Search
CPC . H04L 67/18; H04L 61/1511; H04L 43/0864; H04L 43/0823; H04L 43/0852; H04L 61/609
(Continued)

(56) References Cited

U.S. PATENT DOCUMENTS 6,981,055 B1    12/2005   Ahuja et al.
7,711,846 B2     5/2010   Padmanabhan et al.
(Continued)

FOREIGN PATENT DOCUMENTS

CN    101340496 A    1/2009
CN    103548308 A    1/2014
(Continued)

OTHER PUBLICATIONS

Doxa Chatzopoulou et al., IP Geolocation, Jan. 2007, pp. 1-6.
(Continued)

*Primary Examiner* — David R Lazaro
*Assistant Examiner* — Zia Khurshid
(74) *Attorney, Agent, or Firm* — Invoke

(57) ABSTRACT

Conventional efforts for estimating the geographic location (geolocation) of devices associated with particular Internet Protocol (IP) addresses typically yield woefully inaccurate results. In many cases, the estimated IP geolocations are on the wrong continent. Embodiments of the present technology include techniques for identifying and improving incorrect estimates based on latency measurements, Domain Name Server (DNS) information, and routing information. For example, latency measurements from multiple collectors can be used to rate the plausibility of an IP geolocation estimate and, in certain cases, to increase the accuracy of the LP geolocation estimate. DNS and routing information can be used to corroborate the estimated IP geolocation. The resulting more accurate IP geolocation estimate can be used to route Internet traffic more efficiently, to enforce rules for routing sensitive information, and to simplify troubleshooting.

20 Claims, 15 Drawing Sheets

Related U.S. Application Data

(60) Provisional application No. 62/195,488, filed on Jul. 22, 2015.

(51) Int. Cl.
*H04L 61/4511* (2022.01)
*H04L 43/0864* (2022.01)
*H04L 43/0823* (2022.01)
*H04L 43/0852* (2022.01)

(52) U.S. Cl.
CPC ...... *H04L 43/0864* (2013.01); *H04L 61/1511* (2013.01); *H04L 61/609* (2013.01)

(58) Field of Classification Search
USPC .......................................................... 709/224
See application file for complete search history.

(56) References Cited

U.S. PATENT DOCUMENTS

| | | |
|---|---|---|
| 7,983,691 B1 | 7/2011 | Wong et al. |
| 8,131,834 B1 | 3/2012 | Augart |
| 9,026,145 B1 | 5/2015 | Duleba et al. |
| 2003/0009594 A1 | 1/2003 | McElligott |
| 2004/0078490 A1 | 4/2004 | Anderson et al. |
| 2004/0081154 A1* | 4/2004 | Kouvelas ................ H04L 45/04 370/392 |
| 2008/0037536 A1 | 2/2008 | Padmanabhan et al. |
| 2008/0301271 A1 | 12/2008 | Chen et al. |
| 2010/0202298 A1 | 8/2010 | Agarwal et al. |
| 2011/0282988 A1 | 11/2011 | Wang et al. |
| 2013/0007256 A1 | 1/2013 | Prieditis |
| 2013/0311160 A1 | 11/2013 | Cowie |
| 2014/0258523 A1 | 9/2014 | Kazerani et al. |
| 2014/0280881 A1 | 9/2014 | Szamonek et al. |
| 2015/0088972 A1* | 3/2015 | Brand ................... H04L 67/101 709/203 |
| 2015/0281028 A1 | 10/2015 | Akhter et al. |
| 2019/0007503 A1 | 1/2019 | Zmijewski et al. |

FOREIGN PATENT DOCUMENTS

| | | |
|---|---|---|
| JP | 2004-507917 A | 3/2004 |
| JP | 2018-521610 A | 8/2018 |

OTHER PUBLICATIONS

Cicalese et al., "A fistful of pings: Accurate and lightweight anycast enumeration and geolocation," 2015 IEEE Conference on Computer Communications (INFOCOM), Apr. 26, 2015, pp. 2776-2784.

Ethan Katz-Bassett et al: "Towards IP geolocation using delay and topology measurements", Proceedings of the 2006 ACM SIGCOMM Internet Measurement Conference; Oct. 25-27, 2006, [Proceedings of the ACM SIGCOMM Internet Measurement Conference. IMC], Oct. 25, 2006 (Oct. 25, 2006), pp. 71-84.

Govindan R et al: "Heuristics for Internet map discovery", INFOCOM 2000. Nineteenth Annual Joint Conference of the IEEE Computer and Communications Societies, Proceedings, IEEE Tel Aviv, Israel Mar. 26-30, 2000, vol. 3, Mar. 26, 2000 (Mar. 26, 2000), pp. 1371-1380.

Gueye et al., "Constraint-Based Geolocation of Internet Hosts", IEEE/ACM Transactions on Networking, vol. 14, No. 6, Dec. 2006, pp. 1219-1232.

Siwpersad et al., "Assessing the geographic resolution of exhaustive tabulation for geolocating Internet hosts", International Conference on Passive and Active Network Measurement, 2008, 12 pages.

\* cited by examiner

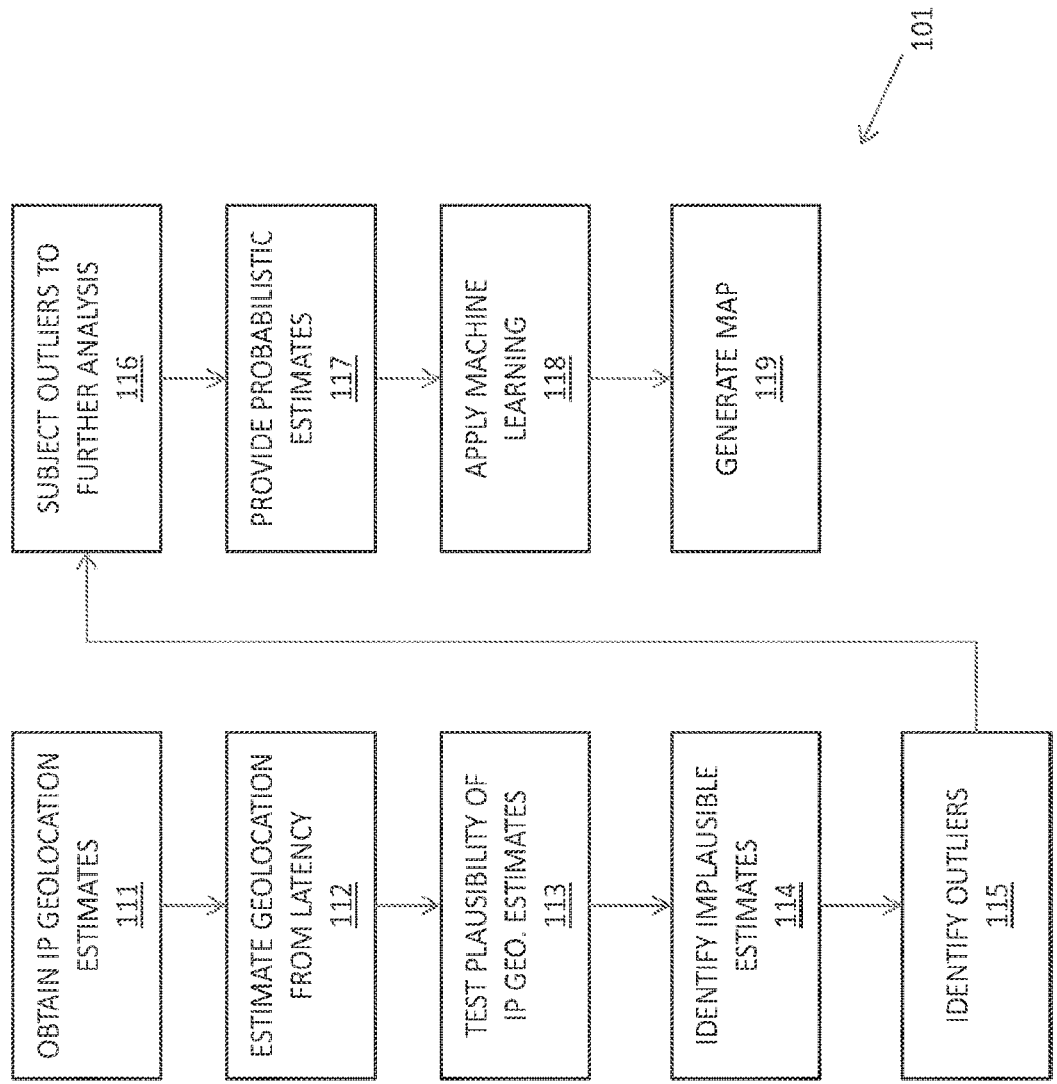

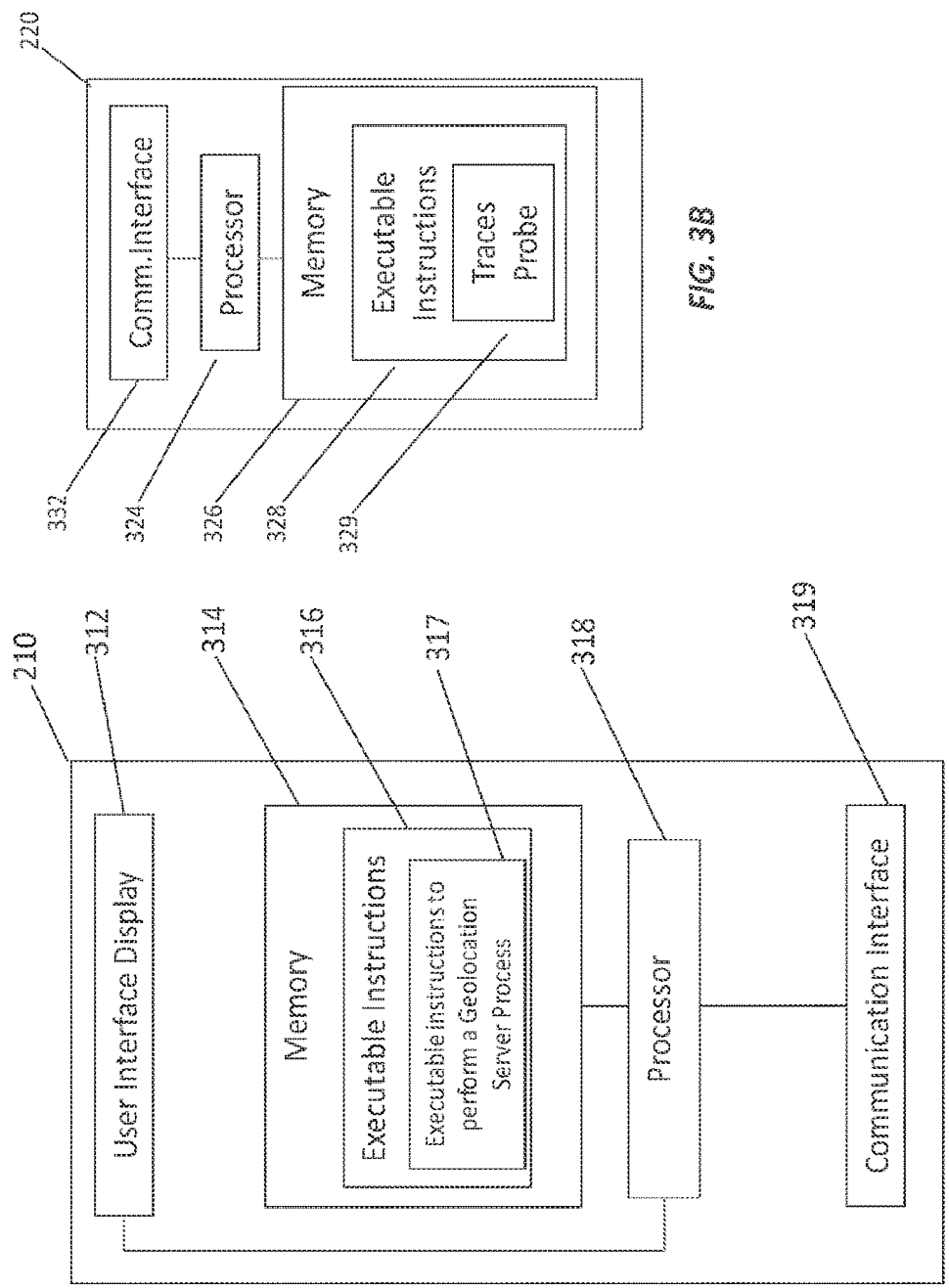

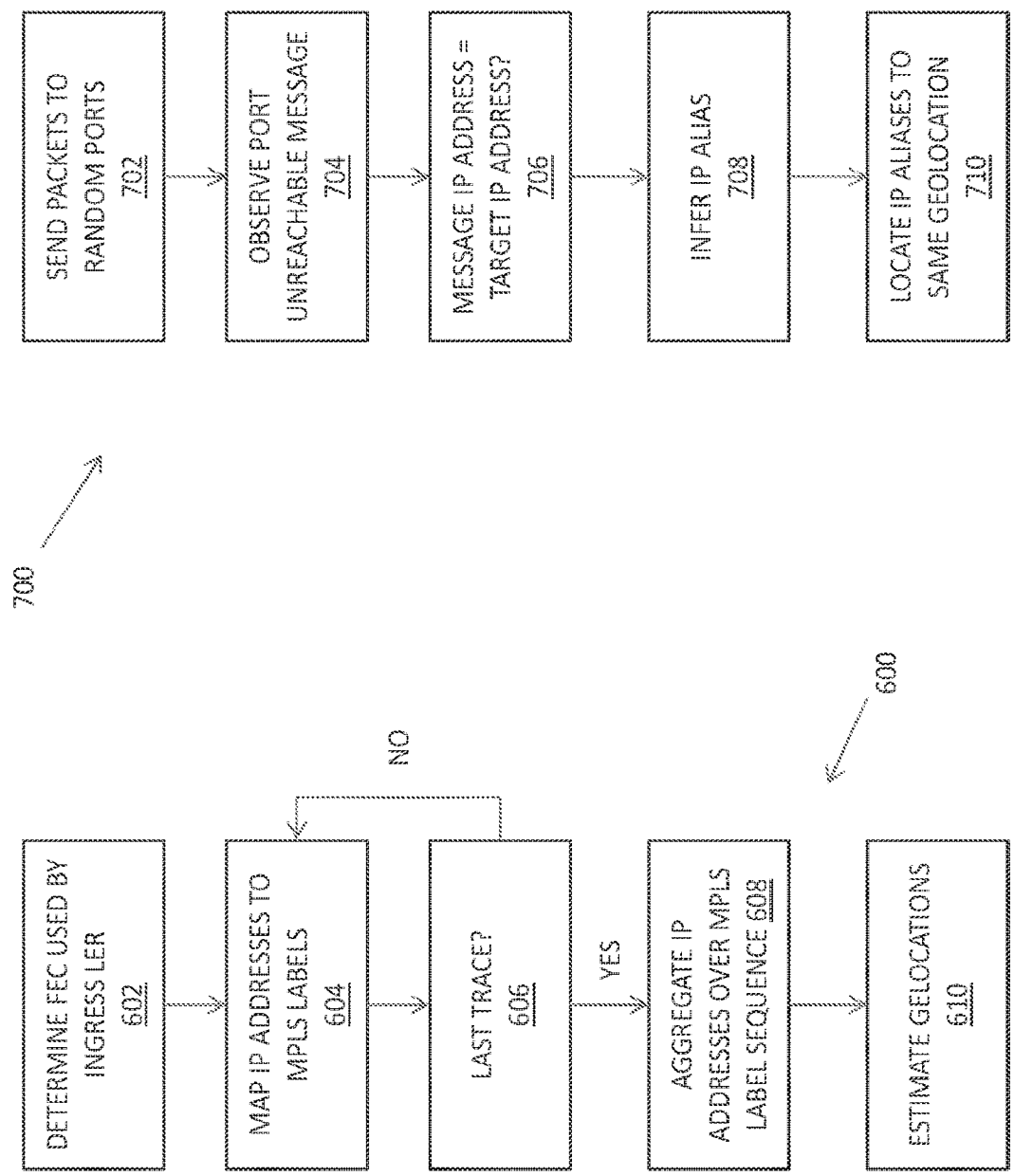

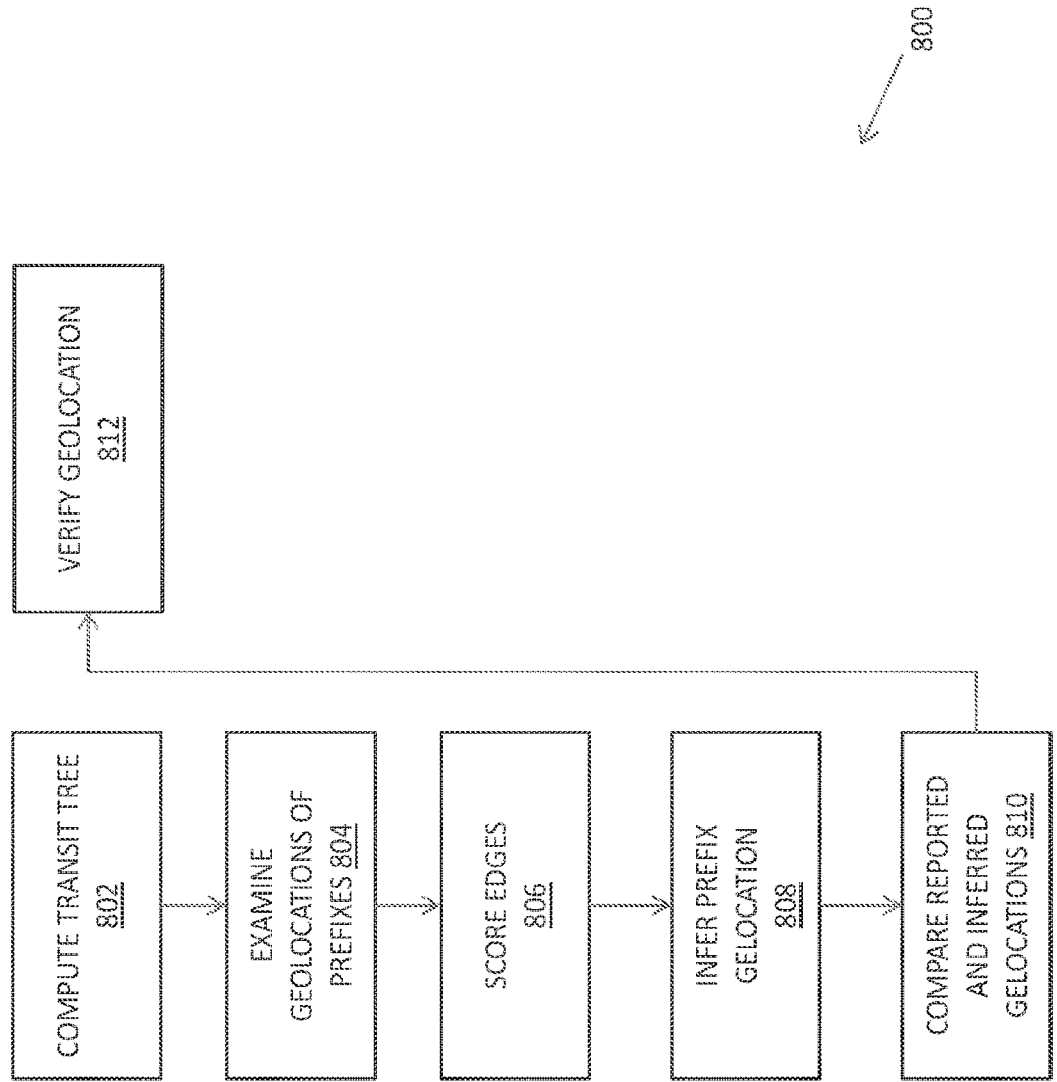

METHODS, SYSTEMS, AND APPARATUS FOR GEOGRAPHIC LOCATION USING TRACE ROUTES

INCORPORATION BY REFERENCE; DISCLAIMER

Each of the following applications are hereby incorporated by reference: application Ser. No. 15/746,598 filed on Jan. 22, 2018; application no. PCT/US2016/043328 filed on Jul. 21, 2016; application No. 62/195,488 filed Jul. 22, 2015. The Applicant hereby rescinds any disclaimer of claim scope in the parent application(s) or the prosecution history thereof and advises the USPTO that the claims in this application may be broader than any claim in the parent application(s).

BACKGROUND

Internet protocol (IP) geographic location, or IP geolocation, is the practice of deducing or estimating the physical location of a device associated with a particular IP address. In other words, IP geolocation is the practice of pinning an IP address to a location on Earth with a desired degree of specificity. Techniques for estimating or deducing the geographic location of a particular IP address include inferring the geographic location from (1) the domain name server (DNS) names of the corresponding internet host or local network nodes; (2) latency measurements between the IP address and a set of devices distributed across known geographic locations; and (3) a combination of partial IP-to-location mapping information and border gateway protocol (BGP) prefix information. For more information on these techniques, see, e.g., U.S. Pat. No. 7,711,846, which is incorporated herein by reference in its entirety.

Unfortunately, IP geolocation estimates tend to be inaccurate and sometimes wildly so because they are based on observations of logical relationships among IP addresses, routing protocols, and applications instead of the physical relationships among cables, routers, servers access devices, etc. Although the logical relationships are often related to the physical relationships, they are not necessarily tied together. For example, IP addresses that are next to each other in internet space are not necessarily next to each other geographically and vice versa: Brazil and Peru border each other geographically, but not in Internet space. In addition, a change in a device's physical location may not necessarily correspond to a change in the device's location in internet space or vice versa. Consider a router that announces a particular prefix via BGP. By announcing the prefix, the router establishes one or more logical Internet relationships that remain fixed from a logical standpoint even if the router moves in physical space.

Moreover, prefixes don't need to be in one place. End-user networks often have a single geographic scope, but infrastructure IP addresses, such as those used in wide-area networks (including routers, switches and firewalls) can be dispersed throughout the provider's area of operation, which can be global in scope. Hence, consecutive infrastructure IP addresses can be physically located in distant cities, even when they are routed to the rest of the Internet as a single prefix.

In addition, the network information used to infer or estimate geolocation can be inaccurate, incomplete, or both. Prefix registration is often self-reported by end users without being checked for validity by regional internet registrars. DNS information can be misleading; for example, domains associated with a particular region (e.g., uk) are not necessarily hosted in that region. Although internet service providers often use city abbreviations in router interface names, the naming conventions vary by provider and aren't always up-to-date. For example, the router interface could be named for the city at the far end of the fiber optic cable to which it is attached. Similarly, BGP information may be inconclusive, especially for those regional providers who announce prefixes that cover extensive geographic areas (e.g., continents).

Latency measurements can also be imprecise, often because of delays that artificially inflate the measurement time, which in turn leads to an inflated estimate of the geographic distance between Internet nodes. These delays include but are not limited to serialization delay, which is the time for encoding the packet; queueing delay at the router; and propagation delay equal to the product of the total propagation distance and the propagation speed (about 200,000 km/sec for light in optical fiber). If the communication medium (usually optical fiber) follows a meandering path instead of a straight path between two points, the propagation delay will be higher. In practice, many optical fibers follow meandering paths along existing rights-of-way. In other cases, optical fibers follow meandering paths because of geographic constraints (e.g., hills and rivers), economic constraints (e.g.; lack of a business relationships between a property owner and an internet service provider), or both. Generally, the longer the latency, the more likely the propagation path is circuitous and likely to result in an artificially inflated estimate of the distance between the endpoints.

Incomplete or inaccurate network information and imprecise latency measurements cause the degree of uncertainty associated with the estimate of an IP address's physical location to rise with degree of specificity of the geolocation estimate. For instance, a particular IP address's planet (Earth) can be deduced with a very high degree of confidence. The confidence level tends to fall when identifying the IP address's continent. The uncertainty tends to increases further for the IP address's country, in part because of variations in each country's size and borders. Confidence in IP geolocation at the metropolitan area/city level tends to be even lower and depends in part on the city's location and proximity to other cities.

SUMMARY

The inventors have recognized that available IP geolocation data tends to be imprecise due to incorrect registry and/or DNS information and delays in latency measurements. In addition, prefixes can overlap and be related in complex ways, which complicates the problem of precise IP geolocation. The inventors have also recognized that imprecise IP geolocation data can adversely affect internet traffic management and troubleshooting. More specifically, an imprecise IP geolocation estimate can lead to high DNS latencies and inaccurate DNS-based load balancing, e.g., to European resources when traffic is actually from the US. In addition, imprecise IP geolocation estimates can lead to inaccurate conclusions about the locations and causes of network problems, which in turn may lead to improper, inefficient, or even futile troubleshooting.

Embodiments of the present technology include methods and systems of IP geolocation that can be implemented more precisely than other IP geolocation techniques. One example includes a method of locating at least one device operably coupled to the Internet and having an IP address. This method comprises automatically obtaining, from a third party, a first estimated geographic location of the device that is based on the device's IP address. It also comprises measuring, from each sensor in a plurality of sensors operably coupled to the Internet, a respective latency distribution associated with transmissions to the IP address of the device. (Each sensor in the plurality of sensors is at a different geographic location.) A processor selects at least one latency from among the measured latency distributions and identifies the sensor that measured the selected latency. The processor estimates the maximum possible geographic distance from the sensor to the device based on the latency and compares it to the distance between the first estimated geographic location of the device and the geographic location of the sensor. If the first estimated geographic location of the device is not within the maximum possible geographic distance from the geographic location of the sensor, the processor determines a second estimated geographic location of the device based on the maximum possible geographic distance and the geographic location.

Other embodiments include another method of estimating a geographic location of at least one device operably coupled to the Internet and having an IP address. This method includes automatically obtaining, from a first party, a first estimated geographic location of the device based on the device's IP address and automatically obtaining, from a second party, a second estimated geographic location of the device based on the device's IP address. A processor determines the distance between the first and second estimated geographic locations. If the distance exceeds a predetermined threshold, the processor measures, from each sensor in a plurality of sensors operably coupled to the Internet, a respective latency associated with transmissions to the device's IP address. (Each sensor in the plurality of sensors is at a different geographic location.) The processor selects at least one latency from among the respective latencies, identifies the sensor that measured the selected latency, and estimates a maximum possible geographic distance from the sensor to the device based at least in part on the selected latency. The processor then determines a third estimated geographic location of the device based on the maximum possible geographic distance estimated from the geographic location of the sensor.

New and updated geolocation estimates may be used to route packets to and/or from the device(s) so as to reduce packet latency and/or increase packet throughput. They may also be used to route packets around, away from, or through a particular geographic area, e.g., to comply with rules or laws regarding data security. Geolocation estimates may also be used to select an Internet Service Provider (ISP) and resolve Domain Name System (DNS) queries.

Embodiments of the present technology also include methods and apparatus for estimating a geographic location of a routed network prefix in an Internet Protocol (IP) address. To estimate the geographic located of the routed network prefix, a processor or other computing device computes a transit tree for the routed network prefix. The transit tree represents an Autonomous System (AS) path to the routed network prefix and indicates at least one edge between a first AS and a second AS. The processor infers a first estimated geographic location of the routed network prefix based on the geographic locations of the first AS and the second AS. In some cases, the processor may compare the first estimated geographic location to a second estimated geographic location of the routed network prefix obtained from a third party. If the first and second estimated geographic locations don't match, the processor may verify the first estimated geographic location with latency measurements of transmissions to and from the routed network prefix.

Yet another embodiment of the present technology includes methods and apparatus for estimating a geographic location of a device having a first IP address. In this cases, a collector or other device connected to the computer network (e.g., the internet) transmits a packet to the first IP address. In response to the packet, the collector receives a port unreachable message from a second IP address different than the first IP address. And in response to the port unreachable message, the collector or another processing device coupled to the collector determines that the second IP address is an alias for the first IP address. Thus, the collector or other processing device estimates a common geographic location for the first and second IP addresses.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A illustrates a process for estimating a geographic location of at least one device associated with a particular IP address.

FIG. 3A illustrates an example geolocation server.

FIG. 3B illustrates an example traceroute collector device.

FIG. 6B illustrates a process of estimating geographic locations of IP addresses associated with an MPLS tunnel.

FIG. 7A illustrates a process of de-aliasing and estimating geographic locations of IP addresses.

FIG. 8B illustrates a process of estimating a geographic location of a routed network prefix using a transit tree like the one shown in FIG. 8A.

Figure 1B:
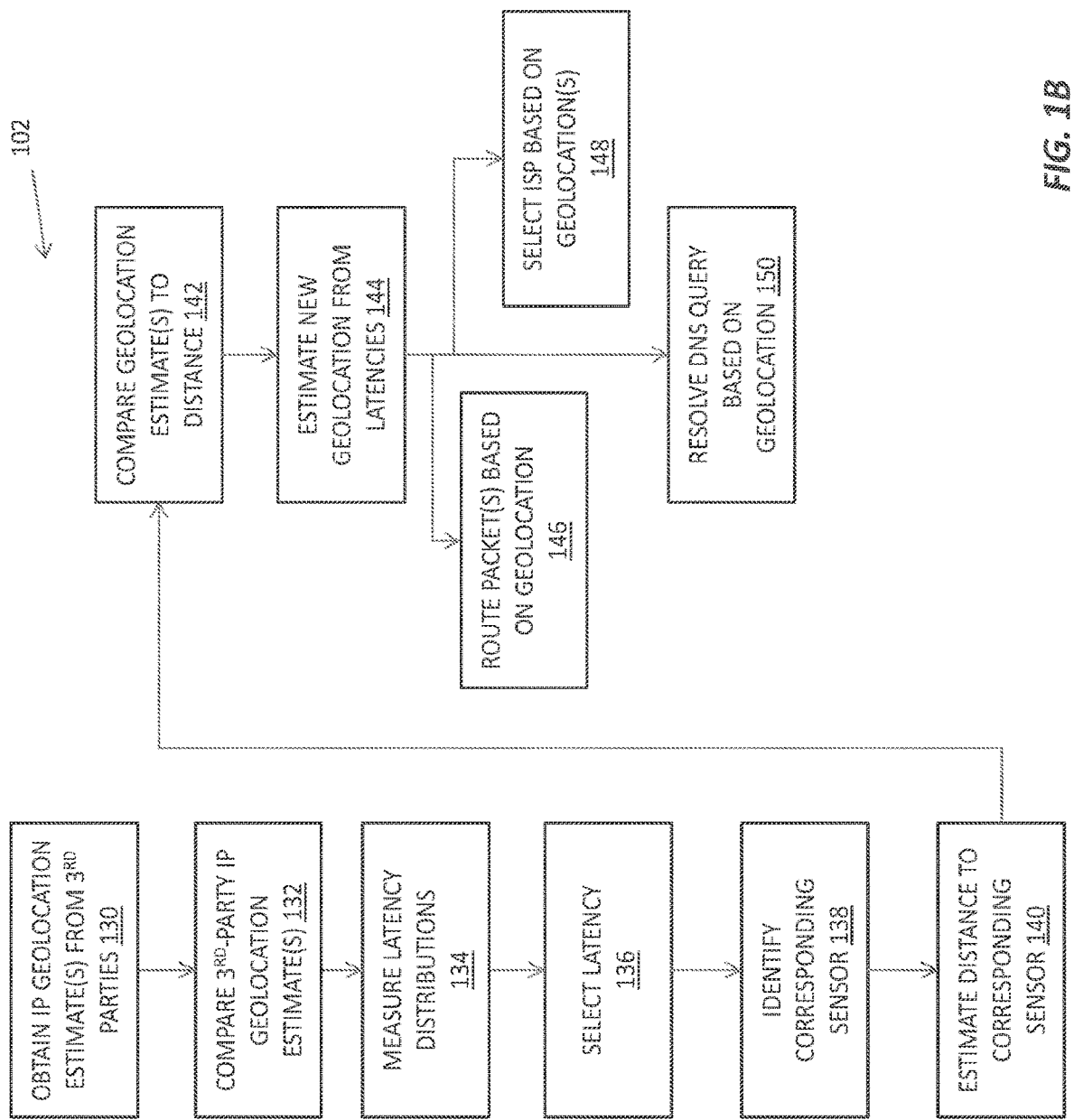
FIG. 1B illustrates another process for estimating a geographic location of at least one device associated with a particular IP address.

The features and advantages of the present invention will become more apparent from the detailed description set forth below when taken in conjunction with the drawings.

DETAILED DESCRIPTION

Following below are more detailed descriptions of various concepts related to, and embodiments of, inventive systems, methods and apparatus for geographic location using trace routes and other information. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In theory, if one knew all internet performance data, then one could route internet traffic perfectly; in practice, however, not all internet performance data is known, so the available internet performance data and geographic location information is used to steer internet traffic. For example, a request for data from a South American IP address may be routed to a South American data center based on assumed geographic proximity of the IP address to the data center. But South American IP addresses can have limited connectivity with each other; for example, the Amazon Rain Forest and Andes provide major physical barriers to connectivity. Instead, South American internet traffic is often routed through Miami. As a result, it may actually be more efficient to route a request for data from a Brazilian IP address to a Miami data server instead of to a Colombian data center even though the Colombian data center is geographically closer to the Brazilian IP address. Similarly, incorrect information about the geographic location of a particular IP address may also lead to routing that unnecessarily increases latency, congestion, etc.

More precise estimates about the geographic locations (geolocations) of IP addresses can be used to steer traffic more efficiently on the internet. For example, an IP address's geographic location can be used to predict the theoretically limited latency for transmitting packets to and from the IP address. Geolocation data could be tied to a global latency map for routing decisions more likely to approach the theoretical latency limits. Geolocation data could also be used to identify the physical locations of traffic sources and destinations with a degree of precision that would provide enough information to make intelligent routing decisions yet also provide some degree of anonymity for the source and destination locations. For example, geolocation information could be used to route sensitive traffic within or away from certain countries, e.g., in order to comply with export regulations or to reduce exposure to eavesdropping. Geolocation information could also be used to troubleshoot network problems and plan network expansion.

An IP address's geolocation can be estimated from latency measurements, DNS name, routing information, or various public or private sources (e.g., published data center locations, job boards, store locations, etc.). Triangulation using latency measurements from many known points provides a rough estimate of location, but optical fiber doesn't go in straight lines, there may not be enough geographically distinct points, the measurement points locations may not be known with sufficient precisions, they may not be distributed uniformly/ideally, the speed of light is too fast to make short measurements (1 ms in fiber=100 km), etc. DNS name information, which often includes the city name or airport code associated with an IP address, can be used to algorithmically parse names recovered for different IP addresses of an ISP's infrastructure, but naming conventions can vary between ISPs, can be inconsistent, or can be wrong. In addition, devices can be moved, making it difficult to verify their locations. Geographic location can also be estimated from routing information based for a specific service provider's service region, but tends to work only on a macro level for regional players.

The technology disclosed herein involves IP geolocation based on latency measurements, DNS information, and routing. But unlike many other technologies, examples of the present technology can be used to detect and correct inconsistencies or errors in geolocation data provided by third parties, including commercial geolocation information. This geolocation data tends to be right for end users, but wrong for infrastructure, which limits its utility for routing and analyzing Internet traffic.

Identifying and Correcting Errors in Third-Party IP Geolocation Estimates

FIG. 1A illustrates a process 101 for refining a geolocation estimate of a device associated with a particular IP address from third-party IP geolocation data. In this example, the process starts with obtaining geolocation data (block 111), which may include latitude and longitude estimates of one or more IP addresses. This data can be obtained from a third-party, such as a commercial location source (e.g., Neustar, MaxMind, Digital Envoy, etc.), prefix registration data, or other public or private sources, on a regular basis, an on-demand basis, automatically, or in response to user intervention.

In block 112, a processor or other suitable device estimates geolocation from latency measurements made from many points around the globe. For example, these measurements can be made with the geolocation systems illustrated in FIGS. 2A-2D. The processor tests the plausibility of the geolocation data using the latency measurements (block 113). If the latency measurements indicate that a particular geolocation estimate is implausible (e.g., because latency measurements indicate that the actual location is closer to a particular measurement site than the geolocation estimate), then the processor may discard the geolocation estimate (block 114).

The processor may also identify outliers in the geolocation data and/or latency measurement using one or more suitable error detection techniques (block 115) as described in greater detail below. The processor may subject outliers to using latency, DNS naming, data mining of public or private sources, and/or routing information as described above (block 116). In block 117, the processor provides probabilistic estimate of discrepant IP address's actual geolocation based on the latency, DNS naming, public or private sources, and/or routing information.

If desired, the processor can apply machine learning techniques to improve confidence of discrepancy identification (block 118). In other words, the processor may reduce the confidence interval with information from successive measurements. Generally, more latency measurements yield higher confidence IP geolocation estimates. The processor can also generate a map or other representation that shows the original geolocation estimates, the corrected geolocation estimates, and/or the corrections themselves (block 119).

The following example illustrates how the process shown in FIG. 1A can be used to evaluate and correct commercially available IP geolocation estimates of the end-user prefix 195.160.236.0/22. The traceroute data to the IP address 195.160.236.1 in the end-user prefix 195.160.236.0/22 from a collector in Hanover, N.H. is as follows:

| Hop | Probe 1 Latency | Probe 2 Latency | Probe 3 Latency | DNS Name (if any) and Hop IP Address |
|---|---|---|---|---|
| 1  | 1 ms  | 1 ms  | 1 ms  | dslrouter [1.254.254.1] |
| 2  | 29 ms | 26 ms | 27 ms | 10.20.10.1 |
| 3  | 28 ms | 25 ms | 25 ms | 64.222.166.66 |
| 4  | 31 ms | 28 ms | 28 ms | POS3-0-0.GW3.BOS4.ALTER.NET [208.192.176.133] |
| 5  | 38 ms | 29 ms | 28 ms | 0.so-0-1-1XL4.BOS4.ALTER.NET [152.63.22.174] |
| 6  | 39 ms | 38 ms | 36 ms | 0.so-7-0-0.XL4.NYC4.ALTER.NET [152.63.17.97] |
| 7  | 42 ms | 35 ms | 36 ms | 0.xe-5-1-0.BR2.NYC4.ALTER.NET [152.63.18.9] |
| 8  | 39 ms | 36 ms | 36 ms | nyc-brdr-02.inet.qwest.net [63.146.27.209] |
| 9  | 45 ms | 49 ms | 42 ms | bst-edge-04.inet.qwest.net [67.14.30.26] |
| 10 | 60 ms | 54 ms | 59 ms | 63.239.36.122 |
| 11 | 56 ms | 52 ms | 53 ms | vor-b2.worldpath.net [64.140.193.24] |
| 12 | 59 ms | 54 ms | 54 ms | 195.160.236.1 |

End-user prefix 195.160.236.0/22 contains at least two server IP addresses (namely, 195.160.236.9 and 195.160.237.24); is registered via Reseaux IP Européens (RIPE) which is the European regional internet registry; and is self-reported to be in the UK. Two commercial sources place this IP prefix in the UK; four more commercial sources place it in Manchester, England; and another commercial source places it in Laconia, N.H.

End-user prefix 195.160.236.0/22 is announced by Terrenap (AS 23148), which is registered in Miami, where the major internet service providers include Verizon, Hurricane Electric, and XO. AS 23148 originates 140 prefixes, 113 of which appear to be in the US, with others in Argentina, Belgium, Dominican Republic, Spain, and the Netherlands. But the more specific prefix 195.160.236.0/24 is routed differently: it is announced by WorldPath (AS 3770), which is registered as being in Portsmouth, N.H., where the major internet service providers include AT&T, Cogent, and Century Link. AS 3770 originates 46 other prefixes, all of which appear to be in the US. This suggests that this prefix is actually in two different geographic locations, at least one of which is in the US, but neither of which is in the UK.

DNS information associated with end-user prefix 195.160.236.0/22 gives some additional clues about the physical location, but does not allow a conclusive determination of the prefix's geographic location. Traceroute measurements yield the DNS names of the routers associated with this prefix. Typically, the DNS names include the following three-digit airport codes or city abbreviations indicative of the nearest airport or city. In this case, the router DNS names include the following codes (with the airport code interpretation following): BOS (Boston, USA); NYC (New York City, USA); BST (Bost, Afghanistan); and VOR (Undefined). Thus, DNS information alone does not necessarily provide a precise IP geolocation estimate, although DNS information may be used to corroborate other evidence of a particular geographic location.

Latency measurements can set an upper bound on the distance between the prefix and one or more measurements sites. In this case, latency measurements indicate that the target IP (195.160.236.1) is no more than 5300 km from Hanover, N.H., and no more than 1800 km of New York City (assuming that NYC name derived from the DNS information is correct and that the packets used for the latency measurements followed symmetric paths to and from the target IP address). These measurements rule out the UK as a possible location for the target IP address.

However, simply subtracting the latency measurements may not yield an accurate estimate of the target IP address's geographic location because of error in the latency measurements. Sources of error include delays (discussed in Background above), asymmetry in the paths to and from the target IP address (i.e., the measurement packet follows one path from the measurement device to the target IP address and a different path from the target IP address to the measurement device) and multiprotocol label switching (MPLS), which is discussed in greater detail below. Nevertheless, even a single latency measurement can used be used to discard an inaccurate IP geolocation estimate.

Fortunately, synthesizing many latency measurements can reduce the uncertainty in the IP geolocation estimate, provided there are no systematic measurement errors. For example, making many latency measurements between a pair of nodes typically yields a distribution of latencies. The shortest latency may yield a more accurate measurement of the distance between the nodes. The estimate can be improved by making more latency and traceroute measurements to the target IP from many different measurement sites.

In this case, making more traceroute measurements to these two servers in the end-user prefix 195.160.236.0/22 narrows the location down further:
a traceroute from Portsmouth, N.H. to 195.160.236.9 is one hop:
1 gw-vip.ep.psm1.senesys.com (195.160.236.9) 0.235 ms 0.236 ms 0.236 ms
a traceroute from Miami, Fla. to 195.160.237.24 is also one hop:
1 master.ep.mia1.renesys.com (195.160.237.24) 0.269 ms 0.309 ms 0.310 ms This prefix belongs to Dynamic Network Services datacenters: 195.160.236.0/24 is announced out of Portsmouth. N.H., and 195.160.236.0/22 is announced out of Miami, Fla. As long as the /24 prefix is available, 195.160.236.9 is in Portsmouth and 195.160.237.24 is in Miami, Fla. If the /24 prefix goes away, both prefixes (and hence both IP addresses) are in Miami.

FIG. 1B shows another process 102 for estimating geographic locations of computers, routers, and other devices based on their IP addresses. In step 130, a geolocation server or other processor automatically obtains geolocation estimates of one or more computers, routers, etc. from one or more third-party services. In some cases, the geolocation server may download or receive these estimates automatically from a server operated by the third party. If the geolocation server receives geolocation estimates for a given IP address from more than one source, it may compare the geolocation estimates with each other (step 132). If the estimates don't match for example, they are too far apart (e.g., more than 100 km apart) or if one is generic (e.g., "North America") and the other is specific (e.g., "New York, N.Y.")—the geolocation server may obtain latency distributions for transmissions between the IP addresses and collectors or sensors (step 134).

For instance, the geolocation server may derive the latency distributions from round-trip time (RTT) associated with transmitting packets between the IP addresses and 200 or more collectors as described in detail below. The geolocation server (or the collectors) may, determine a RTT distribution based on the RTT measurements for each collector, and then estimate the latency based on the RTT distribution to within a confidence interval associated with the RTT measurements. In some cases, the geolocation server eliminates RTT measurements that are associated with Multiprotocol Label Switching (MPLS) hops or that are too short or too long (and therefore indicate a physically improbable distance between the collector and the IP address). The geolocation server may also identify sources of error in the latencies and adjust the latencies to account for these errors.

In step 136, the geolocation server selects one or more latencies from the latency distributions for each IP address being geolocated, then identifies the corresponding collector(s) in step 138. Next, the geolocation server estimates the distance(s) between the IP address and the collector(s) using the selected latencies. More specifically, the geolocation server can use the latency measurements and the speed of light in optical fiber to estimate the maximum distance between the IP address and the corresponding collector. If the geolocation server selects three or more short latencies made from collectors surrounding the IP address, it can estimate the IP address's geographic location more precisely using triangulation techniques like those illustrated in FIG. 5. (If not all of the ranges from the collectors overlap, the geolocation server may identify the IP address as an anycast IP address as described in more detail below.)

Figure 1C:
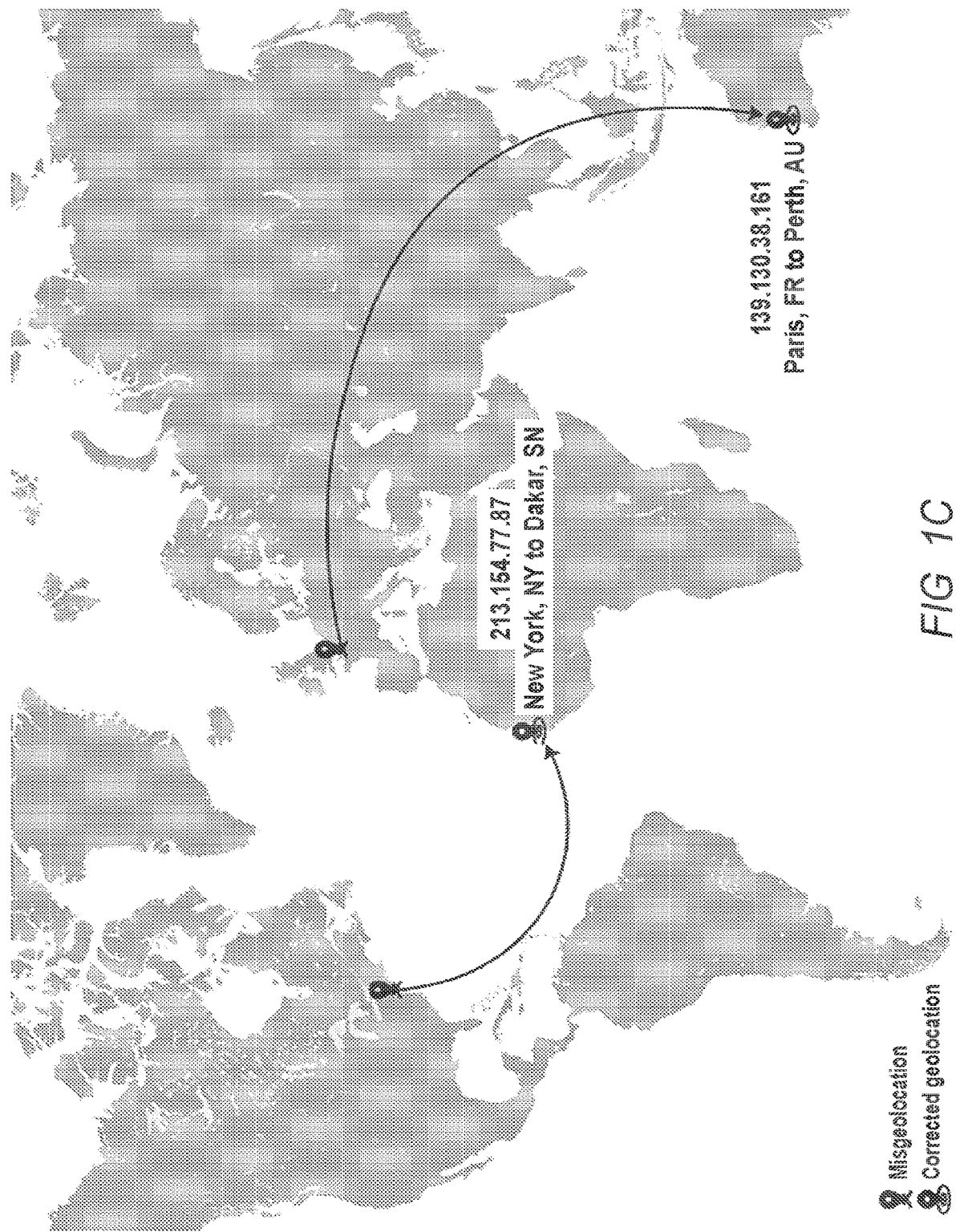
FIG. 1C is a map showing corrections to geographic location estimates of IP addresses made using processes like those illustrated in FIGS. 1A and 1B.

In step 142, the geolocation server determines if the third-party geolocation estimate is within the circle (or intersection area) delineated by the distances estimated in step 140. If so; the geolocation server may indicate that the third-party geolocation estimate is accurate to within a particular distance range. If not, the geolocation server generates a new geographic location for the IP address based on the collector locations and distance calculations. This new estimate may fall within a confidence interval set by the RTT measurement distribution, which affects the uncertainty of the distance measurements. In some cases, the changes are quite dramatic. For example, FIG. 1C shows a map generated using new and old geolocations for a pair of IP addresses, with one IP address relocated from New York City to Dakar, Senegal, and the other relocated from Paris, France, to Perth, Australia.

The new geolocation estimates can be used in a variety of ways. For instance, a processor may use the new geolocation estimates to predict the latency associated with transmitting packets to or from the IP address as part of a routing table update. These updated latencies and routing tables can be used to route traffic more efficiently based on actual distance as opposed to number of hops in the network (e.g., step 146). They can also be used for planning when and where to install additional routers (e.g., in South America to eliminate or reduce the need to send traffic via routers in Miami). This may reduce overall latency and/or increase packet throughput in certain portions of the network.

The new geolocation estimates can also be used to prefer or avoid certain geographic areas. For instance, a user may prefer to route sensitive information away from or around countries or regions known to pose security risks. The user may not route the traffic directly, but may instead select an Internet Service Provider (ISP) to carry the traffic based on the geolocations of the ISP's routers (step 148). A user may also try to route traffic through certain countries, again, by selecting an ISP based on the geolocations of the ISP's routers, in order to conform to laws, regulations, or policies concerning transmission of sensitive information.

The new geolocation estimates can also be used to resolve Domain Name System (DNS) queries based on geographic locations in addition to or instead of hop counts and latencies (step 150). By accurately knowing the geolocation of the user, the domains queried by the user can be resolved to the most appropriate data center hosting the requested context, where data centers can be selected to be geographically close, thereby reducing latencies, or for any of the previously mentioned reasons.

An Example Geolocation System

Figure 2A:
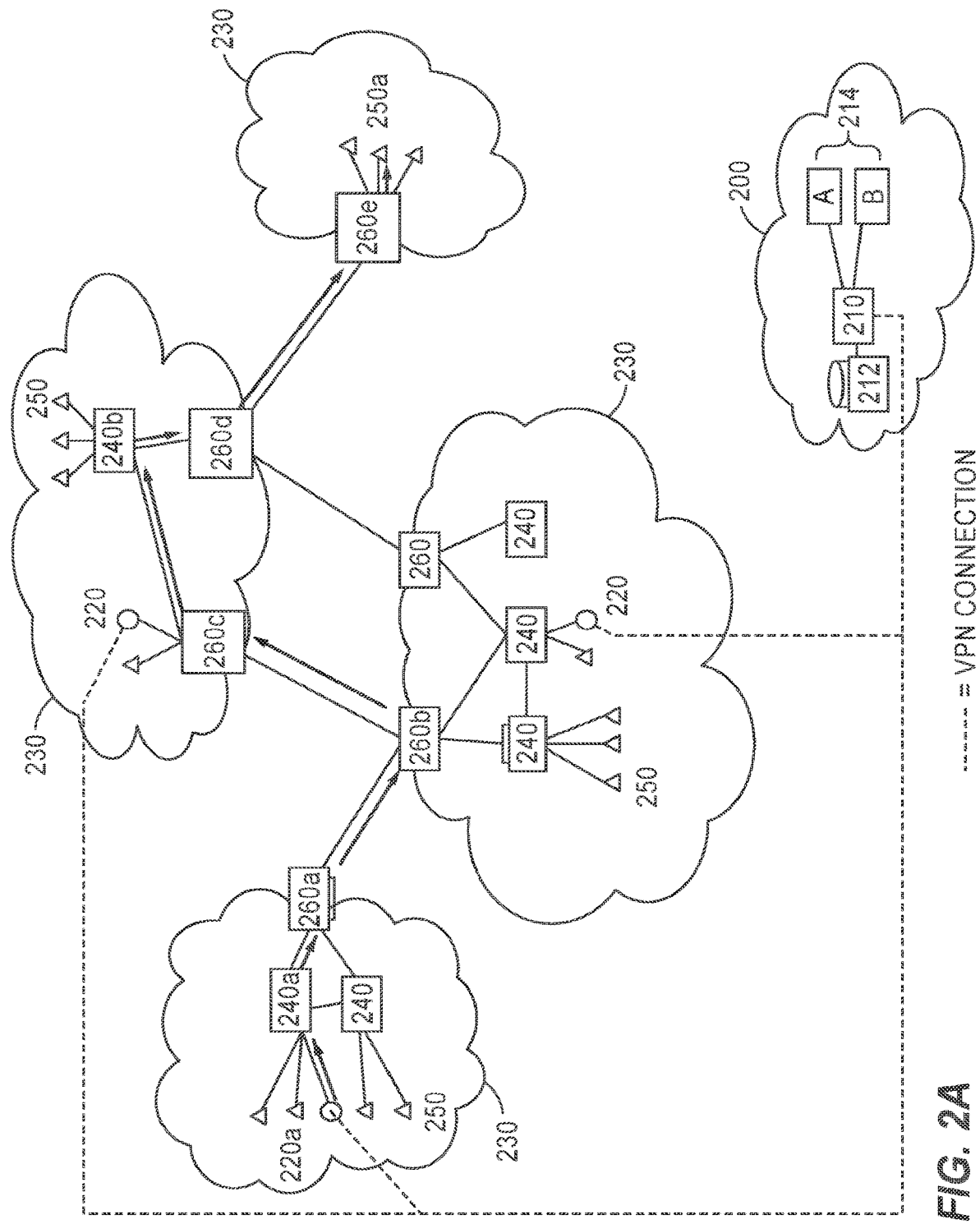
FIG. 2A illustrates an example of a geolocation system suitable for performing the IP geolocation process shown in FIGS. 1A and 1B.

FIG. 2A illustrates an example of a geolocation system 200 suitable for collecting traceroute data that can be used to identify and correct errors in third-party geolocation data, e.g., according to the process 101 shown in FIG. 1A. If desired, the collected traceroute data can be combined with DNS data and with routing data collected from Internet Service Providers (ISPs e.g., Sprint, AT&T etc.).

The geolocation system 200 shown in FIG. 2A includes a geolocation server 210, which is coupled to a geolocation database 212, one or more clients 214, and a network of traceroute collectors 220. For clarity, FIG. 2A shows only one geolocation server 210 and database 212, though the system 200 may include and/or use multiple synchronized geolocation servers 210 and databases 212. When multiple geolocation servers 210 are used, the geolocation servers 210 can be synchronized for processing data that can be distributed over multiple databases 212. Accordingly, the databases 212 can be synchronized and thus can communicate using wired and/or wireless communications protocols and/or techniques.

The traceroute collectors 220 are real or virtual machines that reside within the data centers of their respective providers, each of which belongs to an Autonomous System (AS) 230, or routing domain. In operation, the traceroute collectors 220 measure latencies associated with routes to the routers 240, target computing devices 250, and Border Gateway Protocol (BGP) routers 260 (also known as border routers 260) within their own ASes 230 and within other ASes 230.

An AS 230 can be thought of as a zip code of computing devices 250—i.e., each AS 230 can be pictured as a neighborhood of the Internet that is based on an ISP and not necessarily geographic in scope. Within each AS 230, there are Border Gateway Protocol (BGP) routers 260 (also known as border routers 260) and other routers 240 that implement the routing policy of the AS 230 and maintain connections to BGP routers 260 in neighboring ASes 230. At the time of filing, the number of ASes on the global Internet is over 54,000.

More formally, an AS 230 is a connected group of IP networks with a single, clearly defined routing policy that is controlled by a common network administrator (or group of administrators) on behalf of a single administrative entity (such as a university, a business enterprise, a business division, etc.). Nodes within a given II network in an AS 230 share the same network prefix, employing individual LP addresses within that prefix for Internet connectivity. Most Autonomous Systems 230 comprise multiple network prefixes. An AS 230 shares routing information with other ASes 230 by exchanging routing messages between border routers 260 using BGP, which is an exterior gateway protocol (EGP) used to perform inter-domain routing in TCP/IP networks.

Routing information can be shared within an AS 230 or between ASes 230 by establishing a connection from a border router 260 to one of its BGP peers in order to exchange BGP updates. As understood by those of skill in the art, the process of exchanging data between border routers 260 is called "peering." In a peering session, two networks connect and exchange data directly. An internal BGP peering session involves directly connecting border routers 260 and internal routers 240 within a single AS 230. An external BGP peering session involves connecting border routers 260 in neighboring ASes 230 to each other directly.

Figure 4:
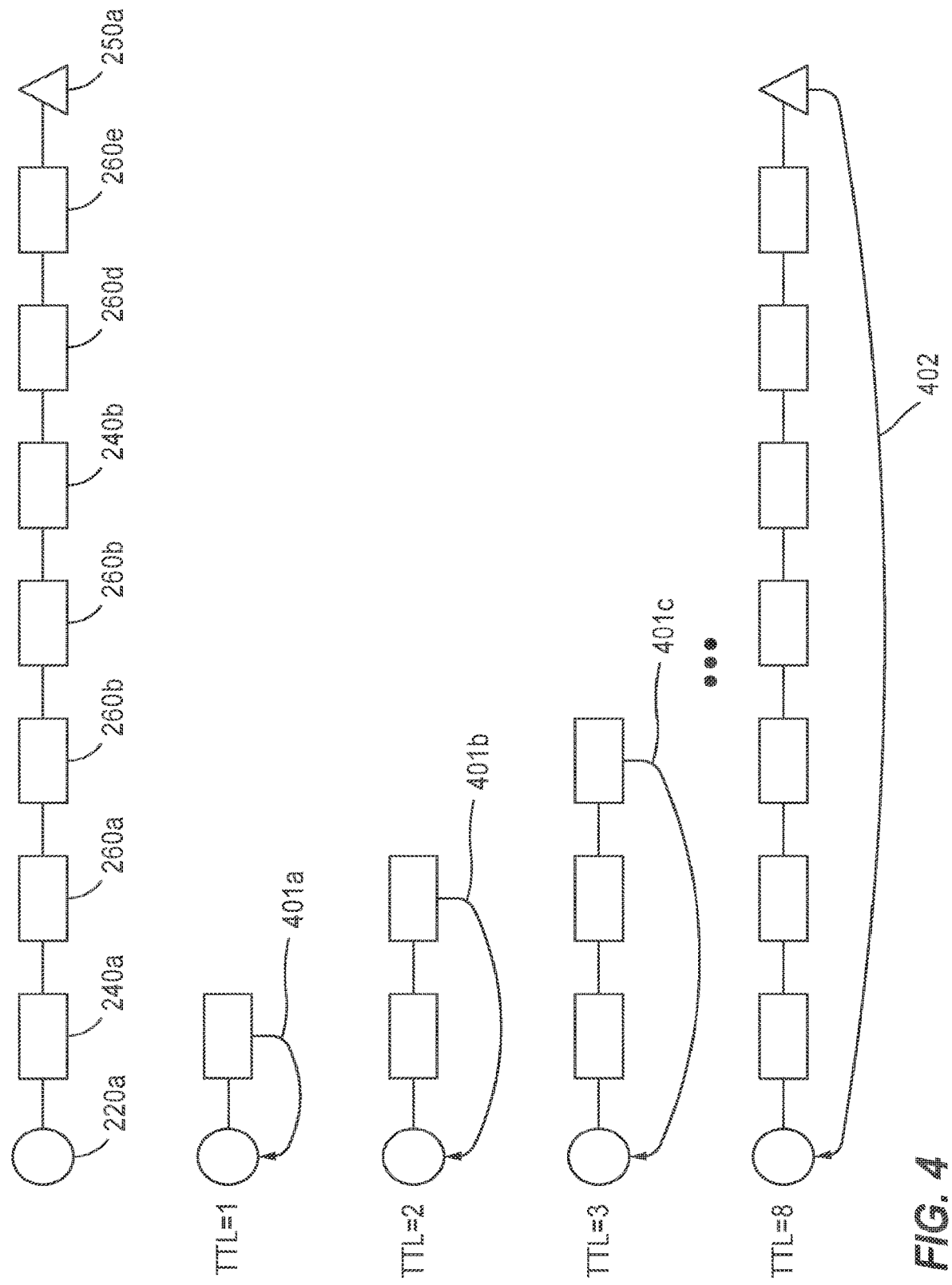
FIG. 4 illustrates a process for determining a particular traceroute (shown with dark arrows on FIG. 2A) by incrementing TTL.

FIG. 2A and FIG. 4 illustrate a traceroute measurement from traceroute collector 220 to destination computer 250a. The traceroute collector 220a sends a first packet to the destination computer 250a using the Internet Control Message Protocol (ICMP). The traceroute collector 220a also specifies a hoplimit value for the first packet, known as the "time to live" (TTL), that is equal to 1. When the first router 240a receives the first packet, it decrements the TTL (from 1 to 0). Upon processing a packet with TTL=0, the first router 240a returns a "Time Exceeded" message 401a to the traceroute collector 220a instead of forwarding the first packet to the next router along the path to destination computer 250a. This enables traceroute collector 220a to determine the latency associated with the hop to the first router 240a on the path to the target computer 250a. The traceroute collector 220a then sends a second packet to the target computer 250a with a TTL=2. The second router 260a returns another Time Exceeded message, and so forth. Subsequent packets (containing TTL=3 through TTL=6) elicit Time Exceeded messages from routers 260b, 260c, 240b, 260d, and 260e. When the destination computer 250a receives the final packet with TTL 7, it returns an "Echo Reply" message 402 to the traceroute collector 220a, enabling the traceroute collector 220a to measure the latency of the final hop.

In addition to the traceroute data obtained by the traceroute collectors 220, each geolocation database 212 can include other data, including but not limited to BGP UPDATE message data, routing registry data, domain name server (DNS) data, Internet network data, data mining of public and private sources, and/or other data related to or derived from any or all of these sources of data. This data may be collected from ISPs and/or other sources and can be used to improve geolocation estimate accuracy as explained above and below.

Global Coverage and Distribution of Traceroute Data Collectors

Figure 2B:
FIG. 2B illustrates the location of traceroute data collectors including physical and virtual traceroute data collectors and/or network sensors.

FIG. 2B illustrates the location of traceroute data collectors in the globally distributed traceroute data collection system of FIG. 2A. The system may include dozens to hundreds or even thousands of collectors (e.g., 300+ collectors) distributed based on geographic accessibility, population density, IP address density, etc. Each dot on the map in FIG. 2B represents a different physical or virtual traceroute data collector.

Figure 2C:
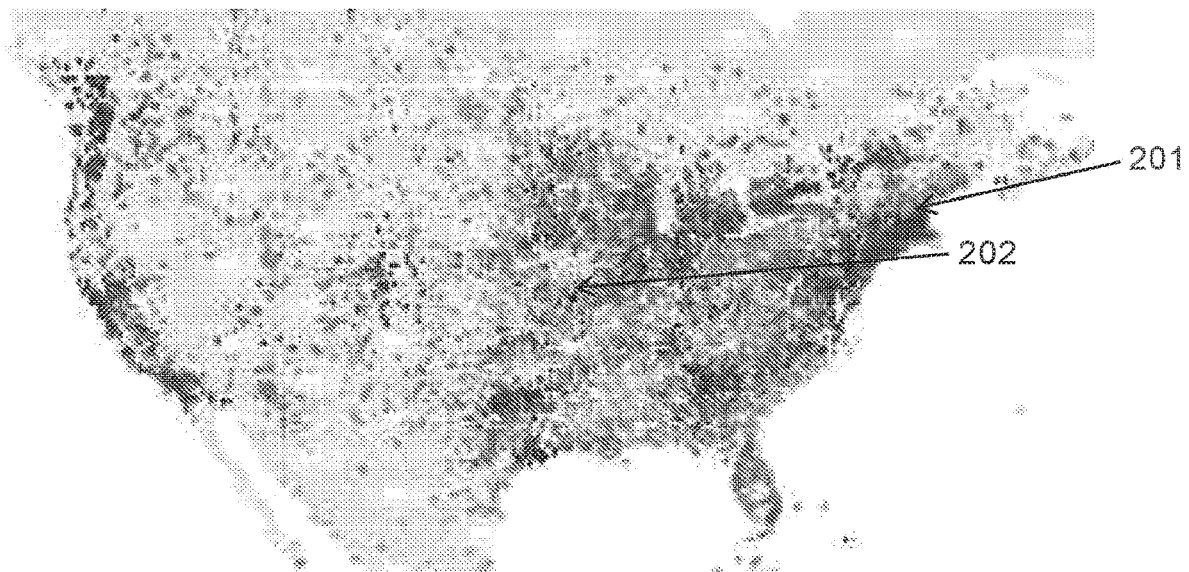
FIGS. 2C and 2D illustrate geographical coverage by globally distributed traceroute data collectors and/or network sensors.
Figure 2D:
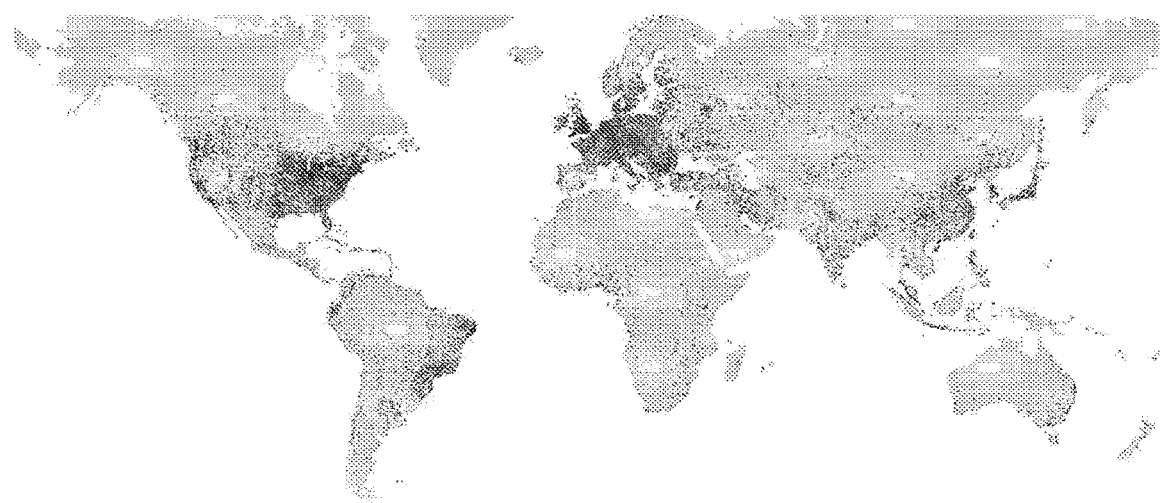

FIGS. 2C and 2D illustrate geographical coverage of a globally distributed traceroute data collection system like the one shown in FIGS. 2A and 2B. The shading in FIGS. 2C and 2D indicates the median latencies to cells or groups of Internet Protocol (IP) addresses. More specifically, each quarter-degree latitude-longitude cell in FIGS. 2C and 2D is shaded according to the median latency to all IPs in that cell from the closest current traceroute data collector. The darker a cell 201 appears in FIGS. 2C and 2D, the closer a traceroute collector is to all IPs in the cell and, hence the better the accuracy of the geolocation estimates. The darker the cell 202 appears in FIGS. 2C and 2D, the farther the traceroute data collectors are from that cell and the less precise a geolocation estimate can be considered. Black indicates 0 ms latency, white indicates at least 100 ms latency, and gray indicates intermediate latency (e.g., 25 ms).

The shading: in FIGS. 2C and 2D may assist in placing additional collectors and in weighting the data collected by the traceroute collectors with respect to each cell. One optimal scenario is one in which the cells are completely black. Such an optimal scenario would result in the estimation of geolocation with a 100% reliability or accuracy.

Geolocation Servers and Traceroute Data Collectors

FIG. 3A illustrates a block diagram of a geolocation server 110, which includes a processor 318 coupled to a user interface 312, a communication interface 319, and a memory 314, which stores executable instructions 316. These executable instructions 316 include instructions for performing a geolocation server process 317, which, when implemented by the processor 318, causes the processor 318 to analyze to estimate the geolocation of an IP address based on traceroute data, network prefix information, etc.

The processor 318 can include one or more high-speed data processing units to execute program components for executing user and/or system-generated requests. Often, these high-speed data processing units incorporate various specialized processing units, such as, but not limited to: integrated system (bus) controllers, memory management control units, floating point units, and even specialized processing sub-units like graphics processing units, digital signal processing units, and/or the like. Additionally, the processor 318 may include internal fast access addressable memory, and be capable of mapping and addressing memory beyond the processor itself; internal memory may include, but is not limited to: fast registers, various levels of cache memory (e.g., level 1, 2, 3, etc.), RAM, ROM, etc. The processor 318 may access the memory 314 and the executable instructions 316 through the use of a memory address space that is accessible via instruction address, which the processor 318 can construct and decode allowing it to access a circuit path to a specific memory address space having a memory state and/or executable instructions.

The communication interface 319 may accept, connect, and/or communicate to a number of interface adapters, conventionally although not necessarily in the form of adapter cards, such as but not limited to: input output (I/O) interfaces, storage interfaces, network interfaces, and/or the like. For example, a network interface included in the communication interface 319 can be used to send and receive information from the traceroute collector device 320 in FIG. 2A.

The user interface display 312 can include a Cathode Ray Tube (CRT) or Liquid Crystal Display (LCD) based monitor with an interface (e.g., DVI circuitry and cable) that accepts signals from a video interface. Alternatively, the user interface display 312 can include a touchscreen and/or other content display device. The video interface composites information generated by executable instructions 316 which are stored in a memory 314 and executed by the processor 318. The executable instructions 317 include a geolocation server process module 317 with a set of instruction to process and analyze data obtained from one or more traceroute collector devices 220. The user interface display 312 may include a conventional graphic user interface as provided by, with, and/or atop operating systems and/or operating environments such as Apple OS, Windows OS, Linux, Unix-based OS and the like. The user interface display 312 may allow for the display, execution, interaction, manipulation, and/or operation of program components and/or system facilities through textual and/or graphical facilities. The user interface display 312 provides a facility through which users may affect, interact, and/or operate a computer system. A user interface display 312 may communicate to and/or with other components in a component collection, including itself, and/or facilities of the like. The user interface display 312 may contain, communicate, generate, obtain, and/or provide program component, system, user, and/or data communications, requests, and/or responses.

FIG. 3B illustrates a block diagram of an example traceroute collector device 220. The traceroute collector device 220 includes a communication interface 332 and processor 324 like the communication interface 319 and processor 318, respectively, in the server 110. The traceroute collector 220 also has a memory 326 that stores executable instructions 328, including instructions 329 for collecting traceroute data from one or more target computing devices (for example, routers 240 and target computing devices 250 in FIG. 2A).

Traceroute Data Collection and Traceroute Data

FIGS. 1 and 4 illustrate working principles of a traceroute data system. To perform a traceroute, traceroute collector 220a sends a first packet to the destination computer (250a) using the Internet Control Message Protocol (ICMP). The traceroute collector 220a also specifies a hoplimit value for the first packet, known as the "time to live" (TTL) that is equal to 1. When the first router 240a receives the first packet, it decrements the TTL (from 1 to 0). Upon processing a packet with TTL=0, the first router returns a "Time Exceeded" message 401a to the traceroute collector 220a instead of forwarding the first packet to the next router along the path to destination computer 250a. This enables traceroute collector 220a to determine the latency associated with the hop to the first router 240a on the path to the target computer 250a. The traceroute collector 220a then sends a second packet to the target computer 250a with a TTL=2. The second router 260a returns another Time Exceeded message, and so forth. Subsequent packets (containing TTL=3 through TTL=7) elicit Time Exceeded messages from routers 260b, 260c, 240b, 260d, and 260e. When the destination computer 250a receives the final packet with TTL=8, it returns an "Echo Reply" message 402 to the traceroute collector 220a, enabling the traceroute collector 220a to measure the latency of the final hop.

By increasing the TTL each time it sends a packet and monitoring the "TTL exceeded" responses 401a, 401b, 401c, and so on from the intermediate routers, the traceroute collector device 220a discovers both successive hops on the path to the destination computer 250a and the time for a round trip to the destination computer 250a. The collected "TTL exceeded" responses are used by the traceroute collector device 220a to build a list of routers traversed by the ICMP packets, until the target device 250a is reached and returns an ICMP Echo Reply 402.

The collected traceroute data comprises identifiers for each device in the traceroute, including an identifier and/or and IP address for the corresponding traceroute collector device 220. The IP addresses contained may represent routers that are part of a global or local computer network. The traceroute data also includes times representing the time it took to the traceroute collector device 220 to obtain responses from the routers and the time it took to the traceroute collector device 220 to obtain an ICMP Echo Reply from the target computing device.

If desired, the traceroute data obtained by the traceroute collector devices 220 can be received and processed by the geolocation server 110 to generate an intermediate human readable format in a data structure as shown below:

```
tr_base_fields = [('dcv',str),      # data version
    ('ts',int),                     # timestamp of start of trace
    ('protocol',str), # [I]CMP,[U]DP,[T]CP
    ('port',int),
    ('collector_ip', str),
    ('collector_external_ip', str),
    ('collector_name', str),
    ('target_ip', str),
    ('halt_reason', str),#
[S]uccess,[L]oop,[U]nreachable, [G]ap
    ('halt_data', int),# additional information for
failed trace
    ('hoprecords', T5HopList)]
```

An example of traceroute data in the tr_base fields data format is presented below. Each field is listed on a separate line to simplify the description of the geolocation server process:

1: T5
2: 1431005462
3: I
4: 0
5: 192.170.146.138
6: 192.170.146.138
7: vps01.nyc1
8: 88.203.215.250
9: S
10: 11.
11: q,0,1,0
12: 63.251.26.29,0.363,2,254
13: 74.217.167.75,1.297,3,252
14: 129.250.205.81,1.171,4,252
15: 129.250.4.148,1.614,5,250,576241
16: 129.250.3.181,87.140,6,250,519266
17: 129.250.4.54,112.258,7,247,16013
18: 129.250.3.25,114.446,8,248
19: 83.217.227.22,123.002,9,245
20: 212.39.70.174,125.613,10,245
21: 88.203.215.250,124.967,11,51

The fields used for geolocation include: 2: timestamp (seconds since Jan. 1, 1970, the UNIX Epoch); 7: collector name (unique identifier for each collector; this one is in New York City); 8: traceroute target IP address; and 11 thru 21: traceroute hops (a variable number that depends on the network topology).

Each hop contains a comma-separated sub-list with: hop IP (q if no response was received); round-trip time (RTT) in milliseconds; TTL; Reverse TTL; and zero or more MPLS labels.

In some implementations, the geolocation server process is based on latency from traceroute data collectors, which is the RTT value found in each hop. As illustrated by the above example, one traceroute can yield several responding hops, each with an IP and a round trip time (RTT) from a collector (in this case, a collector located New York City). The geolocation server process dissects each traceroute into individual (collector-city, IP, RTT) tuples or collector edge latencies.

In this example of collected traceroute data, consider line 12: 63.251.26.29,0.363,2,254. The IP address 63.251.26.29 is seen 0.363 milliseconds (RFT) from the collector. In some implementations, the geolocation server process may not consider the 3rd or 4th fields in the hop (TTL and reverse TTL). A unique integer identifier can be utilized for each city. For example, New York's geonameid is 5128581. A hop from a traceroute data collector device located in New York City can be represented as the tuple: (5128581, 63.251.26.29, 0.363).

Based on speed of light in fiber constraints, a 1 ms RTT corresponds to a maximum possible distance travelled of about 100 km along a great circle or round trip. This means that for this hop, with an RTT of 0.363 ms, the maximum distance to the device with the IP address 63.251.26.29 from the NYC traceroute data collector is 36.3 km (22.6 miles). In some instances, when there is some initial delay in leaving a data center, there is a high probability that this IP is collocated at the same data center. Given this evidence, strengthened by additional measurements from other traceroutes, the geolocation server process can refine the IP geolocation based on the latitude and longitude of the city where the traceroute data collector is located, and the radius covered by such a collector. The geolocation server process analysis, based on speed of light considerations strengthens the inferences that can be drawn from the geolocation server.

Multiprotocol Label Switching (MPLS) and Geolocation in some cases, traceroute hops may contain Multiprotocol Label Switching (MPLS) labels at the end, shown above in lines 15, 16, and 17, which end in MPLS labels 576241, 519266, and 16013, respectively. For the purposes of latency measurements and comparisons, these MPLS hops can be discarded, as their RTTs often correspond to that of the MPLS tunnel egress hop, and so would yield a larger radius-of-plausibility as explained in greater detail below with respect to FIG. 6A. Removal of MPLS hops provides a tighter plausibility envelope when considering multiple measurements. Therefore, in some implementations, the MPLS hops are filtered to improve measurements by reducing a statistically plausibility radius.

Discarding the MPLS labels from the example traceroute data yields the following list of tuples generated for geolocation, where the first element corresponds to the geonameid (5128581) of a New York City collector and origin of this traceroute:
(5128581, 63.251.26.29, 0.63)
(5128581, 74.2170.167.75, 1.297)
(5128581, 129.250.20.5.81, 1.171)
(5128581, 129.250.3.25, 114.446)
(5128581, 83.2170.2270.22, 123.002)
(5128581, 212.39.70.174, 125.613)
(5128581, 88.203.215.250, 124.967)

Note that the IP address in the last hop is 88.203.215.250, which is the same as the target (field 8). This means that the ultimate target device in the traceroute responded or echoed to the probing performed by the traceroute collector device.

Geolocation Using Overlapping Edge Latencies

In some implementations, the traceroute data collectors edge latencies can be based on the traceroutes performed by the globally distributed traceroute data collectors shown in FIG. 2B. (In some cases, the collectors may more perform more than 500,000,000 measurements per day from a total of over 300 collectors.) The geolocation server can generate statistical inferences based on multiple measurements for each edge. The timers embedded in each traceroute data collectors may add noise to the measurements of the observed RTT which is utilized to define the plausibility radius from each collector to the IP address. To account for measurement imperfections or noise, the geolocation server can eliminate outliers with (potentially artificially) low RTTs, using the modified Thompson Tau test to identify outliers. As a computational expediency, using the 25th percentile latency for each collector edge does a reasonable job eliminating outliers and so can be used in place of the modified Thompson Tau test. The 25th percentile is used from this point forward, but this should be viewed as one of many ways outliers can be eliminated rather than as a defining aspect of the present techniques. Other possibilities include but are not limited to using the 5th, 10th, or 15th percentile, the median, the mode, or any other suitable technique for reducing or eliminating outliers.

Figure 5:
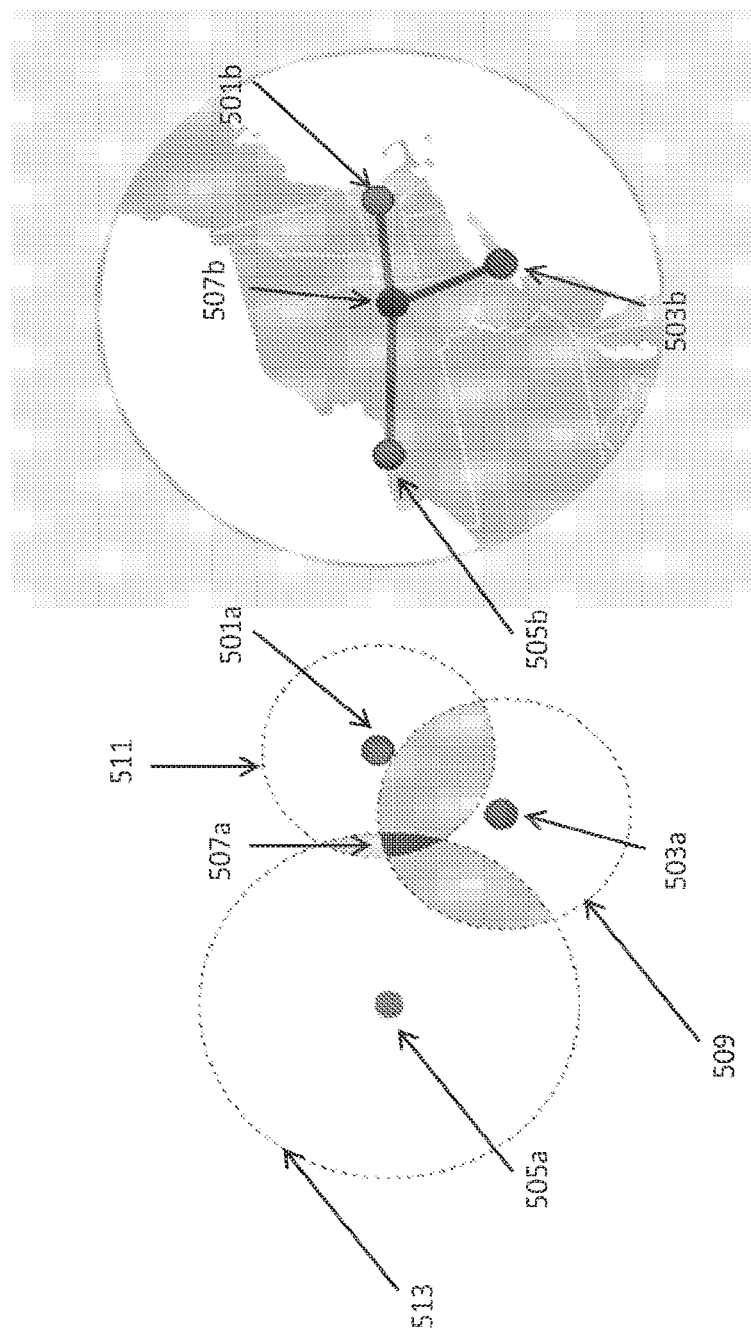
FIG. 5 illustrates the intersection of the areas covered by three traceroute data collectors.

FIG. 5 illustrates the intersection of the areas covered by three traceroute data collectors. In some implementations, the geolocation server process can generate a plausible radius from each collector to an IP address corresponding to a target computer device. For example the traceroute data collector device 501a, 503a, and 505a. For a given IP address, network prefix and/or target device, the intersection of the circles 509, 511, and 513 defined by the radius covered by each collector, defines an area 507a where the IP is plausibly geolocated. Cities within that area are candidates for the geolocation of that IP. For example, among the traceroute data collectors 501b, 503h, and 505b, the city 507b can be a candidate city depending on the traceroute data collected by the collectors.

In some instances, the circles may not intersect. In such a case, the latencies may indicate that an IP is close to two or more collector cities, that is, closer to each collector city than the midway point between a pair of collectors. Such situation is classified as a geo-inconsistency, since it indicates that a device with the same LP is located at more than one location. This is a property of an anycast network. The geolocation server process identifies instances of geo-inconsistencies and tags the corresponding IPs as anycast.

Because Internet providers can change the locations of a given IP, the collected traceroutes are probed constantly to help ensure that measurements to the target IP are made while a target's geolocation is stationary.

An example of pseudo code representation of some functions of the geolocation server process including probing target devices, identification of cities of such target devices, and the identification of anycast IP addresses, substantially in the form of PUP. Hypertext Preprocessor code, is provided below:

```
# For each IP found in traceroutes, construct a sorted list
# of (25th percentile RTT, collector-city)
func ip_to_collector_latencies(traceroutes):
    # Construct RTT array for each unique (collector_city, IP) pair
    rtt_dictionary = new dict
    for all recent traceroutes:
```

```
        for each hop in traceroute:
            if not MPLS(hop):
                rtt_dictionary[(collector_city, IP)].append(RTT)
    # Construct list of 25th percentile RTTs, collector city pairs for
each IP
    collector_latencies = new dict
    for each. IP:
        for every pair-wise combination of collector cities:
            if collector1-IP-latency + collector2-IP-latency <
                    minimum possible latency between collectors:
                mark IP as anycast
                break
        if IP is not anycast:
            rtt_collector_list = new list
            for each collector_city:
                rtt_array = rtt_dictionary[(collector_city, IP)]
                rtt25 = compute_25th_percentile_latency(rtt_array)
                rtt_collector_list.append((rtt.25 , collector city))
            rtt_collector_list.sort( )
            collector_latencies[IP] = rtt_collector_list
    return collector_latencies
# When correcting a third-party geolocation of an IP,
# we can compute the minimum possible RTT to each collector city,
# and compare against the observed latency
func is_geolocation_plausibile(IP, city):
    rtt_collector_list = collector_latencies[IP]
    for (rtt, collector_city) in rtt_collector_list:
        minpossrtt = minimum_rtt[(city, collector city)]
        if rtt < minpossrtt:
            return False # IP is misgeolocated
    return True # IP geolocation is plausible
# We can also create a list of all plausible cities for
# self-determining an IP geolocation
func geolocate_ip(IP):
    plausible_cities = create_list_of_all_cities( )
    rtt_collector_list = collector_latencies[IP]
    for (rtt25, collector_city) in rtt_collector_list:
        for city in plausible_cities:
            minpossrtt = minimum_rtt[(city, collector_city)]
            if rtt25 < minpossrtt:
                # IP cannot be in this city based on speed-of-light in
fiber consideration
                plausible_cities.remove(city)
    return plausible_cities
```

In some implementations, the geolocation server geolocates an IP address to a larger geographical scope when latencies are too large to reduce the choice to a single city or metropolitan area. If, for example, a final list of plausible cities all reside in the same state or country, the geolocation server process may elect to assign a state- or country-scope geolocation. Further implementations of the geolocation server process determine all plausible grid-cells where the IP may be geolocated.

An Example Geolatency Determination

Consider the IP address 41.181.245.81 originated by the Internet provider AS6637, MTN SA, headquartered in South Africa.

Below is the output from the geolocation server process:
TLATSUMG2 1429865014 1430956773, 41.181.245.81 0 0 0—50
39 2265 342.4 <u>London,GB</u>0.714782643743
(0.7,1478,2643743) (6.2,3,2641170) (10.4,51,2925533)
(20.3,46,2657896) (22.9,1,3173435) (24.4,28,2867714)
(32.0,2,3196359) (32.9,55,3067696) (38.9,1,756135)
(41.0,1,3099434) (46.5,1,649360) (61.3,56,250441)
(68.9,100,5101798) (69.0,3,5128581) (73.6,1,4930956)
(74.6,105,4744870) (75.5,2,4781530) (90.2,4,4887398)
(91.3,2,4180439) (97.2,1,108410) (98.3,113,4164138)
(103.3,2,4684888) (108.5,1,524901) (127.2,1,3598132)
(134.8,1,1277333) (136.1,46,5380748) (136.8,1,1174872)
(138.8,3,5391959) (139.2,1,5730993) (139.7,117,5809844)
(140.4,4,5368361) (149.2,10,3397277) (149.9,2,3369157)
(156.3,1,5392171) (194.2,1,3448439) (204.5,16,3435910)
(264.4,1,1835848) (340.3,1,2023462) (342.4,2,1581130)

The underlined fields in the above output example are the location of the closest collector, the latency to the IP of interest, the number of measurements, and the collector city's geonameid. In this case, the closest collector is in London and the latency from the London collector to the IP is 0.7 ms.

The data below the underlined field are tuples with the 25th percentile latency from each collector. There are three entries in each comma-separated tuple:

RTT (25th percentile), number-of-measurement, geonameid

These tuples are sorted by latency, such that the first tuple right after the underlined fields has the smallest latency.

The tuple (0.7,1478,2643743) is the closest measurement of 0.7 ms, based on 1478 measurements, from the London (2643743) collectors. This repeats information, broken out strictly for convenience, in the previous three fields.

The tuple (6.2,3,2641170) is the second closest measurement at 6.2 ms from the Nottingham (2641170) collector. In total there are 39 collector cities returning measurements to that IP.

The minimum possible RTT latency in fiber between London and Cape Town is 95.7 MS, Since the IP is only 0.7 MS from the London traceroute collector device, based on speed-of-light constraints, the geolocation server process can determine with certainty that the IP address 41.181.245.81 is not located in South Africa as may be suggested by the identity of the Internet Provider. Furthermore, the geolocation server process can assign the geolocation of that IP to London, given its low latency from the London collector. To make this correction, the geolocation server process first determines that other traceroute data collectors support London as a plausible location for that IP.

For example below is a single traceroute data to the IP address 41.181.245,81 from the London collector. Many more traceroutes from numerous locations can be used to provide additional support, before definitively declaring this IP address to be in London.

traceroute to 41.181.245.81 (41.181.245.81), 30 hops max,
60 byte packets 1 20.ae1.edge-01-lon.as33517.net (80.231.219.189) 0.319 ms 0.282 ms 0.361 ms 20.ae0.edge-02-lon.as33517.net (185.38.96.27) 0.365 ms 0.338 ms 0.307 ms 3 xe-10-3-3.edge3.London15.Level3.net (212.187.193.189) 0.358 ms 0.285 ms 0.338 ms 4 MTN-GROUP.edge3.London15.Level3.net (212.187.195.162) 1.791 ms 1.830 ms 1.872 ms 5 41.181.190.190 (41.181.190.190) 2.034 ms 2.083 ms 2.060 ms 6 41.181.245.81 (41.181.245.81) 0.820 ms 0.784 ms 0.914 ms Reverse Domain Name System (DNS)

In some implementations, the geolocation server process can further augment the inferences using reverse DNS (rDNS) for IPs when available. Providers often encode geolocation information in their router names, according to a naming scheme that they define. In the above traceroute example underlined, 80.231.219.189 has the rDNS 20.ae1.edge-01-lon.as33517.net also underlined. The emphasized fragment "lon" in that label indicates that the IP address is located in London. The geolocation server process has a manually derived rule-based engine that extracts geolocation information from these labels, where possible. These labels are entered by humans and subject to errors if not properly maintained, unlike latencies which are bound by physics. However, combining geolocation from rDNS with that from latency can yield more accurate IP geolocation. For example consider 69.252.112.58 se02.woburn.ma.boston.comcast.net Woburn is located about 15 km north of Boston. Applying the geolocation server process to this IP address yields this result:

TLATSUMG2 1430698623 1431022690 69.252.112.58 0 0 0—186 116 1042 307.5 Boston, Mass., US 8.5 6 490956 8.5,6,4930956 9.2,11,5128581 9.4,7,5101798 10.2,6, 5102076 12.8,5,5087168 14.4,16,4744870 15.1,6,414096 15.7,5,4781530 16.4,5,5083221 16.7,5,509188 24.9.14.6167865 29.1,12,4887398 35.8,13,4180439 36.8, 16,4852832 51.4,3,5419384 52.5,14,4164138 54.4,19, 4684888 63.4,6,4699066 66.9,6,5780993 76.3,18, 5809844 77.6,5,6173331 77.8,13,580748 77.8,70, 2643743 78.6,20,5392171 79.2,9,5391959 80.2,4, 3598132 80.9,26,5368361 81.9,2,5746545 83.8,7, 2960316 84.6,11,2787416 84.8,5,2641170 85.3,6, 3991164 87.5,12,2988507 88.8,8,2964574 90.7,6, 4005539 94.3,35,2759794 95.1,84,292553 98.55,4, 3674962 98.6,5,2867714 100.05,12,2657896 100.2,6, 2660646 101.3,14,756135 101.4,8,3173435 101.6,5, 362.849 104.7,5,3117735 107.3,6,3067696 108.5,6, 2761369 109.0,6,267370 111.8,6,2520600 113.9,6, 792680 113.9,6,2735943 114.45,4,3196359 116.1,5, 3099434 116.9,10,3060972 119.0,6,683506 120.0,6, 3054643 120.9,5,226/057 123.2,5,649360 123.9,7, 2523920 126.3,5,625144 123.6,6,5856195 129.0,6, 498817 132.2,5,3397277 132.3,14,745044 133.0,6, 727011 135.6,5,250441 135.6,11,524901 135.9,6,726050 135.9,11,703448 138.7,6,293397 139.2,6,593116 143.25, 4,323786 145.5,5,360630 148.3,6,3871336 149.9,5, 587084 150.5,10,3448439 161.9,5,2543885 162.4,7, 3451190 165.3,6,108410 165.8,3,616052 171.0,3, 3461655 173.6,28,1850147 174.8,9,3435910 183.7,5, 1526384 184.9,5,1528675 187.1.6, 1853909 195.9,11, 292223 196.1,15,1668399 198.6,12,1275339 204.9,5, 1835848 207.25,8,1668341 216.4,4,1174872 217.45,4, 1277333 219.9,9,1273294 220.9,21,2147714 222.3,4, 160263 224.15,4,184745 224.7,6,3369157 224.7,30, 1819729 225.0,10,1264527 230.55,4,1808926 234.8,6, 285787 240.4,5,1176615 243.0,6,1701668 252.2,1, 1880252 25.5,4,1816670 266.2,5,1784658 268.9,6, 6930887 275.05,4,1797929 276.5,5,1821306 276.9,4, 1609350 281.3,3,1581130 231.4,4,2063523 286.5,5, 2028462 300.9,5,2158177 307.5,4,1735161

Boston is the closest traceroute data collector device at 8.5 ms from the IP address (69.252.112.58). But rDNS provides a clue that the IP address is in Woburn, Mass. The geolocation server process verifies if Woburn is among the plausible cities that this collector latency distribution permits. Therefore, the geolocation server process is able to make a more refined geolocation assignment of Woburn, Mass., instead of Boston, enhancing the accuracy of the IP geolocation estimate.

In addition, in some implementations, the geolocation server attempts to discover its own rules automatically by finding similar rDNS names and assigning them geolocations through natural language processing, once they are validated using latencies. It does this by maintaining a database of all rDNS names it has discovered. For IPv4, this is accomplished by reverse resolution of the entire address space, yielding over 1.24 billion rDNS entries as of this writing. For IPv6, given the enormity of the space, rDNS entries are gathered via passive DNS captured from global open DNS recursives and from selective rDNS resolution on routed IPv6 space. rDNS is captured from open recursives by instructing the service to log both the queries it receives and the answers it provides, including, but not limited to, the timestamp of the request, the requested domain and record type, the provided answer, and other attributes that categorize any DNS query and response.

As a simple example, the geolocation server may discover (perhaps by examining existing rules or by considering latencies) that the presence of strings containing 'nyc,' in rDNS strongly correlate to the associated IP addresses being in New York City. There are currently over 2.6 million such rDNS entries in IPv4, many of which are not presently geolocated to New York City by commercial providers.

Consider 67.17.81.197 (loop0.cs1.NYC2.NYC.gblx.net). As of this writing, three different commercial providers alternately place this IP address in Dallas, Tex., USA, Ecuador (no city), or just USA (no city). Latencies are consistent with this IP address being located in NYC and are completely implausible for it being located in Texas or Ecuador. There are presently over one hundred .nyc.glbx.net rDNS records in all of IPv4 space and latencies are consistent with all of them being in New York City. There are also numerous rDNS rules containing 'nyc' that are associated with New York City. Hence, the geolocation server is able to discover that the string 'nyc.gblx.net' in rDNS strongly correlates with the associated IP addresses geolocating to New York City and hence, automatically builds the corresponding rule and adds it to the rules-based rDNS processing engine.

Public and Private Data Sources

In some implementations, the geolocation server identifies plausible physical addresses from public, private, and semi-private sources for further validation by the techniques described here. These sources can include, but are not limited to, job boards and corporate career pages for data center jobs to find the claimed physical address of data centers that are otherwise not published; routing looking glasses, whose pull down menus often provide router locations; store locations that can be tied to IP addresses, such as those of major chains with numerous locations; and prefix registration data from dozens of global and local Internet Routing Registries (IRRs).

As one example of the above techniques, consider the over 36,000 McDonald's restaurants, which are found in 119 countries. Many of these stores are numbered and thousands can be found in the rDNS data mentioned above. Consider the following two IP address and their rDNS entries:

ip-206.59.33.82 fqdn=nmd.med 18734.mia.wayport.net
ip-206.59.233.83 fqdn=eth1-1.nmd.mcd 18734.mia.wayport.net These two IP addresses apparently reference McDonald's store #18734. Scraping a public web site places this store at 1930 Opalocka Blvd, Opa-Locka (Dade County), Fla., 33054, which is approximately 12 miles from the center of Miami. Plausible geolocations found in this way can be further verified by the other method described here.

Anycast Example

A different example can be obtained from the geolocation server process when the target device has an Anycast IP. Consider the result for the IP address 199.27.135.101 shown below:

TLATSUMG2 1429747203 1430956517 199.27.135.101 7191 181.069922721 0.648613384403
1850147=3448439,1850147=3448439,
1835848=3448439,1835848=3448439,1880
252=3674962,1880252=3674962,2147714=2520600,
2147714=2520600,1853909=3448439,
1853909=3448439,1850147=3461655,
1850147=3461655,1819729=3448 439,
1819729=3448439,1835848=3461655,
1835848=3461655,2147714=
3117735, . . . ,683506=1668399 187 116 3833 201.0 Chicago, Ill., US 0.4 48 4887398 0.4,48,4887398 0.4,50, 4164138 0.4,60,4744870 0.4,66,5809844 0.4,73,2147714 0.5,22, 3067696 0.5,97,5368361 0.6,23,2520600 0.6,49, 4180439 0 0.6,73,5392171 0.7,21,2673730 0.7,24, 4781530 0.7,71, 4684888 0.7,124,2925533 0.7,126, 2759794 0.7,232,2643743 0.8,19,3117735 0.8,47, 2988507 0.9,44,5128581 1.0,52, 5380748 1.0,52, 6167865 1.1,113,1850147 1.2,69, 3448439 1.3,24, 2761369 1.3,27,3173435 1.3,36,756135 1. 4,25,4140963 1.4,27,5101798 1.5,20,1835848 1.6,111, 1880252 1.8, 118,1819729 1.9,23,5102076 1.9,37, 5391959 4.6,19, 6173331 5.2,35,3060972 5.3,23,4699066 5 0.4,13, 3461655 5.6,14,3099434 5.6,21,4930956 5.8,36, 2787416 6.0,18,2641170 6.0,26,2960316 6.9,20,2867714 7 0.0,17,3196359 7.1,9,5746545 8.2,19,5083221 8.3,23, 1853909 8.7,21,5091383 10.5,56,4852832 10.6,9, 2964574 10.6,16,3674962 11.0,15,649360 11.9,24, 2660646 12.7,20,498817 13.5,22,593116 13.9,43, 2657896 14.6,18,2158177 16.15, 20,3369157 17.7,21, 3054643 19.0,29,1668341 19.9,24, 792680 20.9,20, 5780993 21.9,44,524901 22.0,21,3991164 22.4, 40,703448 23.0,19,5419384 23.6,27,2523920 24.2,20, 2735943 24.4,19,2267057 26.1,19,5087168 29.5,15, 3598132 29.8, 16,1609350 35.1,36,1264527 37.1,21, 6930887 39.0,18,625144 39.4,57,1668399 41.2,20, 727011 43.2,14,1277333 44.7, 21,683506 44.8,16, 1735161 45.2,24,726050 45.9,20,4005539 46.9,19, 1821306 47.4,15,745044 47.8,16,323786 49.8,22, 5856195 50.1,14,2063523 50.2,18,3397277 51.6,18, 3621849 59.8,23,1701668 61.0,18,250441 61.0,23, 293397 68.0,44,1275339 71.2,18,2548885 73.2,12, 616052 74.9,21,587084 75.8,15,1528675 80.4,11, 1581130 83.4,22,108410 84.9, 37,1273294 93.0,18, 1526384 105.6,47,292223 113.4,25, 3451190 126.1,17, 160263 132.3,15,1174872 141.7,15,360630

The underlined value 7191 in the first line shown in the example above represents the number of geo-inconsistent collector city pairs. While the IP address is 0.4 ms from U.S. Pat. No. 4,887,398 (Chicago), it is also 0.4 ms from U.S. Pat. Nos. 4,164,138, 4,744,870, 5,809,844, and 2,147,714 which are Miami, Ashburn, Seattle, and Sydney, respectively. Given that it is physically impossible for a single device with that IP address to be that close to each of these cities (and several others in that result), it possible to infer that the IP address is an instance of an anycast and can be assigned a geolocation of "Earth."

Determining Geolocation Sandwiches

Consider a traceroute as a sequence of IP addresses starting from the collector IP address and ending with the target IP address. Each IP address can be assigned a geolocation using one or more of the techniques described here and perhaps others as well. The sequence of IP addresses can be further subdivided into subsequences or hop fragments. In some implementations, the geolocation server uses the sandwich approach to consider some or all such fragments in a traceroute where the first and last hop of the fragment geolocate to the same country, but one or more middle hops geolocate to some other country.

The foundation for the sandwich approach is that a traceroute is unlikely to leave one country, enter another, only to return to the original country. If such a fragment is found, one or more of the IP addresses in the fragment are likely mis-geolocated. Each IP address in the fragment can be analyzed further using the techniques described here. In some implementations, the geolocation server process uses a generalization of this approach, looking for any traceroute sequence where the first and last hops in the fragment are seemingly close in distance, but the sum of the hop-to-hop distances for the fragment are large. That is, the net distance from the first to last hop is smaller than the sum of the hop-to-hop distances. Such hair-pinning sequences are sometimes legitimate, for example when traffic from two local providers is exchanged in some distant location, as any two providers that peer may not be physically connected within all markets that they serve for business or other reasons. As with any potential mis-geolocations, such seemingly anomalous geolocations should be verified by the other techniques described here.

Sandwich Geolocation Example

Consider the following traceroute from a New York City collector to an IP address in Australia. A sandwich is identified as the sequence 114.31.199.242, 114.31.199.59, 114.31.199.58 (hops 13, 14 and 15), since these hops geolocate to the US, New Zealand, and the US, respectively. Note that in this case, RTTs are not helpful since each hop of the sequence is in an MPLS tunnel (indicated by the MPLS labels in the fourth column) and so the RTTs reflect the RTT at the end of the tunnel, not at the individual IPs.

| From vps01.nyc1 to 203.209.210.16 at UTC 1434920785 (2015-06-21-21:06:25) | | | | | | |
|---|---|---|---|---|---|---|
| TTL | IP | RTT | MPLS | ASN | CC | City |
| 0 | 192.170.146.138 | 0.0 | — | 29791 | US | New York |
| 2 | 63.251.26.29 | 0.338 | — | 13789 | US | New York |
| 3 | 216.52.95.70 | 0.794 | — | 13789 | US | New York |
| 4 | 38.88.194.85 | 0.897 | — | 174 | US | New York |
| 5 | 154.54.47.17 | 1.347 | — | 174 | US | New York |
| 6 | 154.54.27.157 | 13.565 | — | 174 | US | Cleveland |
| 7 | 154.54.44.85 | 20.738 | — | 174 | US | Chicago |
| 8 | 154.54.6.85 | 32.995 | — | 174 | US | Kansas City |
| 9 | 154.54.30.53 | 70.842 | — | 174 | US | San Francisco |
| 10 | 154.54.28.34 | 71.549 | — | 174 | US | San Jose |
| 11 | 154.54.1.162 | 72.421 | — | 174 | US | San Jose |
| 12 | 38.122.92.2 | 75.331 | — | 174 | US | San Jose |
| 13 | 114.31.199.242 | 241.947 | 16521 | 4826 | US | San Jose |
| 14 | 114.31.199.59 | 237.467 | 289900 | 4826 | NZ | — |
| 15 | 114.31.199.58 | 237.879 | 16721, 16946 | 4826 | US | San Jose |
| 16 | 114.31.199.28 | 241.783 | 16946 | 4826 | AU | Sydney |
| 17 | 175.45.72.119 | 237.379 | 16955 | 4826 | AU | Sydney |
| 18 | 114.31.196.163 | 237.158 | 16741 | 4826 | AU | Melbourne |
| 19 | 114.31.196.38 | 237.027 | — | 4826 | AU | Melbourne |
| 20 | 175.45.117.218 | 252.021 | — | 4826 | AU | Melbourne |
| 21 | 203.209.196.49 | 249.522 | — | 23681 | AU | Melbourne |
| 22 | 203.209.196.61 | 252.346 | 3154 | 23681 | AU | Melbourne |
| 23 | 203.209.210.16 | 269.123 | — | 23681 | AU | Melbourne |

However, there are geolocation clues in the reverse DNS ("sjc" and "ca" in the names shown below) of the IP addresses in the sandwich, suggesting San Jose, Calif. as the geolocation for all three IP addresses.
114.31.199.242 bundle-101.cor01.sjc01.ca.VOCUS.net
114.31.199.59 bundle-100.cor02.sjc01.ca.VOCUS.net
114.31.199.58 bundle-100.cor01.sjc01.ca.VOCUS.net Further testing from a location in San Jose shows that 114.31.199.59 is within 2.157 ms of San Jose, making NZ implausible for its geolocation, since the minimum possible RTT from San Jose to Wellington, NZ, is 107 ms due to light speed constraints.
Traceroute to 114.31.199.59 from San Jose, Calif.:
traceroute to 114.31.199.59 (114.31.199.59), 30 hops max, 60 byte packets
  1   v199.mag01.sjc01.atlas.cogentco.com (66.250.250.113) 0.338 ms 0.347 ms
  2   te0-4-0-1.ccr22.sjc01.atlas.cogentco.com (154.54.84.153) 0.698 ms te0-4-0-1.ccr21.sjc01.atlas.cogentco.com (66.28.4.157) 0.628 ms
  3   be2095.rcr21.b001848-1.sjc01.atlas.cogentco.com (154.54.3.138) 1.242 ms 1.252 ms
  4  38.122.92.2 (38.122.92.2) 1.128 ms 38.122.93.2 (38.122.93.2) 1.120 ms
  5   bundle-101.cor01.sjc01.ca.VOCUS.net (114.31.199.242) 1.348 ms 1.166 ms
  6 bundle-100.cor02.sjc01.ca.VOCUS.net (114.31.199.59) 2.157 ms*

The geolocation server concludes that 114.31.199.59 is 2.157 ms from San Jose, which means the true geolocation is no farther than 215 km from that San Jose collector. So, New Zealand is not a plausible geolocation. The geolocation server also detects the "sjc" airport code for San Jose embedded in the rDNS for this IP address, further supporting San Jose as its actual geolocation and the server corrects this IP address's geolocation to San Jose, Calif.

Edge Latency Geolocation

In some implementations, the geolocation server uses the edge latency algorithm to infer the geolocation of adjacent hops. This is particularly useful when examining the geolocation of the penultimate hop in a traceroute to see if that informs the geolocation of the final target, especially when the final target is end-user network, often called an eyeball network by network engineers, devoid of geolocation hints in its reverse DNS. In such cases, the penultimate hop may be to an infrastructure IP address, for example, a data center router, with the location of the data center embedded in its rDNS.

The approach works by constructing a distribution of latency differences between adjacent IP addresses seen in traceroutes and outside of MPLS tunnels. A median latency difference is computed between the RTT of all such pairs. The computed latency difference is then used to estimate the geolocation of one IP address in a pair, assuming the geolocation of the other is correct. The geolocation server then compares the computed median with the minimum possible RTT for the presumed geolocations of each pair of adjacent IP addresses. If the former is less than the latter, then the geolocation of one or both of the IP addresses is likely incorrect. Furthermore, in some implementations, if the geolocation of one IP address in the pair is well supported, the geolocation server process estimates the geolocation of the other IP address to within a radius from its neighbor as defined by the median RTT and given light speed in fiber.

Penultimate Hop Example

Microsoft has a data center in Wyoming, in Laramie County, near Cheyenne. Consider a traceroute from a Portsmouth, N.H. collector, east of Cheyenne, and one from a Seattle, Wash. collector, west of Cheyenne, as shown below.
Portsmouth to 191.234.85.3 [mpr=27.69 ms]:
traceroute to 191.234.85.3 (191.234.85.3), 30 hops max, 60 byte packets
  1 rtr01.psm1.renesys.com (10.200.0.7) 0.193 ms 0.189 ms 0.188 ms
  2 hsrp2.psm1.renesys.com (195.160.236.3) 2.381 ms 2.395 ms 2.397 ms
  3 ray-b2.worldpath.net (64.140.193.25) 0.470 ms 0.516 ms 0.516 ms
  4 bst-edge-05.inet.qwest.net (63.239.32.25) 6.178 ms 6.188 ms 6.188 ms
  nyc-edge-04.inet.qwest.net (205.171.30.62) 8.228 ms 8.238 ms 8.238 ms

```
 6  63.151.150.98 (63.151.150.98) 8.462 ms 8.129 ms
    8.120 ms
 7  ae0-0.nyc-96cbe-1b.ntwk.msn.net   (207.46.38.113)
    8.038 ms 8.104 ms 8.257 ms
 8  ae6-0.was02-96cbe-1c.ntwk.msn.net (191.234.84.142)
    14.889 ms 14.797 ms*
 9  * * *
10  * * *
11  * * *
12  * * *
13  * * *
14  ae7-0.den01-96cbe-1a.ntwk.msn.net (191.234.84.222)
    52.028 ms 52.041 ms 52.044 ms
15  ae8-0.cys01-96cbe-1a.ntwk.msn.net (191.234.80.191)
    56.479 ms 56.490 ms 54.767 ms
16  191.234.85.3 (191.234.85.3) 54.487 ms 54.500 ms
    57.758 ms
```
Seattle to 191.234.85.3 [mpr=15.45 ms]:
traceroute to 191.234.85.3 (191.234.85.3), 30 hops max, 60 byte packets
```
 1  173.208.32.170.rdns.pingpipe.com (173.208.32.170)
    0.125 ms 0.058 ms 0.055 ms
 2  v3508.er01.sea.ubiquity.io (23.105.64.1) 6.931 ms
    7.117 ms 7.069 ms
 3  38.88.0.25 (38.88.0.25) 0.976 ms 1.161 ms 1.111 ms
 4  154.24.19.33 (154.24.19.33) 1.560 ms 1.510 ms 1.689
    ms
 5  154.24.42.225 (154.24.42.225) 1.653 ms 1.580 ms
    1.753 ms
 6             te0-1-0-7.ccr22.sea01.atlas.cogentco.com
    (154.54.41.145) 1.567 ms 1.325 ms 1.459 ms
 7  be2084.ccr21.sea02.atlas.cogentco.com (154.54.0.254)
    1.740 ms 1.946 ms 2.126 ms
 8  38.104.126.78 (38.104.126.78) 1.177 ms 1.134 ms
    1.076 ms
 9  * * *
10  * * *
11  ae15-0.cys01-96cbe-1a.ntwk.msn.net (191.234.84.11)
    55.000 ms 55.482 ms 55.377 ms
12  191.234.85.3 (191.234.85.3) 55.327 ms 55.269 ms
    55.436 ms
```
The penultimate hop in both traces contains embed rDNS. Each of these hops have cys01 in their rDNS (CYS is the IATA airport code for Cheyenne). The latency for the final target is often within 1 ms of the penultimate hop, strongly suggesting that the penultimate IP address and the target IP address are located in the same data center. The geolocation server places this target IP address in Cheyenne, Wyo., the same location as the penultimate hops, given the latencies between the penultimate hops and the target and the rDNS of the penultimate hops.

Using IP Aliases and MPLS Labels for Geolocation

Network interconnection devices (e.g., routers, firewalls, and switches) typically have many different network interfaces; each of these interfaces may have a unique IP address and may be physically connected to some other device (often by a copper or fiber cable). For example, a single computer device is in a single geographic location, as are all the IP addresses assigned to its (potentially numerous) interfaces. The process of finding all IP addresses belonging to a single piece of equipment is termed de-aliasing.

In some implementations, the geolocation server described above can find aliased IP address using one or more de-aliasing techniques (for example, the Mercator technique) in addition to techniques based on MPLS labels. These techniques enable the geolocation server to determine sets of IP aliases and then infer a common geolocation for each set. Such sets often represent interfaces on a single router on the Internet. As a result, the geolocation server can more accurately determine the entire set's geolocation and can correct the geolocation of many observed traceroute paths and inform or alert one or more users about the potential geolocation of the hops adjacent to the device in question.

The Mercator technique can include sending arbitrary packets to random ports of selected IP addresses and observing when a port unreachable message is returned from an IP address that was not targeted by a particular traceroute data collector. When an appropriate message is received from an IP address that differs from the target of the traceroute data collector, it is possible to infer that the IP address has one or more IP aliases. The worldwide set of traceroute data collectors can target all IP addresses observed in the global traceroutes in this way and thereby collect pairs of plausible IP aliases. In addition, newly discovered IP addresses from this approach can also be added to the list of IP addresses to probe in an iterative fashion, allowing more IP aliases to be discovered. Consistently observed pairs can be collected into common sets via a transitive closure process.

An alternative implementation involves observing common sequences of MPLS labels in the worldwide traceroute data sent to the geolocation server. For a given sequence, the labels will not vary, but the IP addresses encountered can vary as different router interfaces are traversed by different traces. The MPLS labels can then be used by a geolocation server to associate different UP addresses with the same device.

Figure 6A:
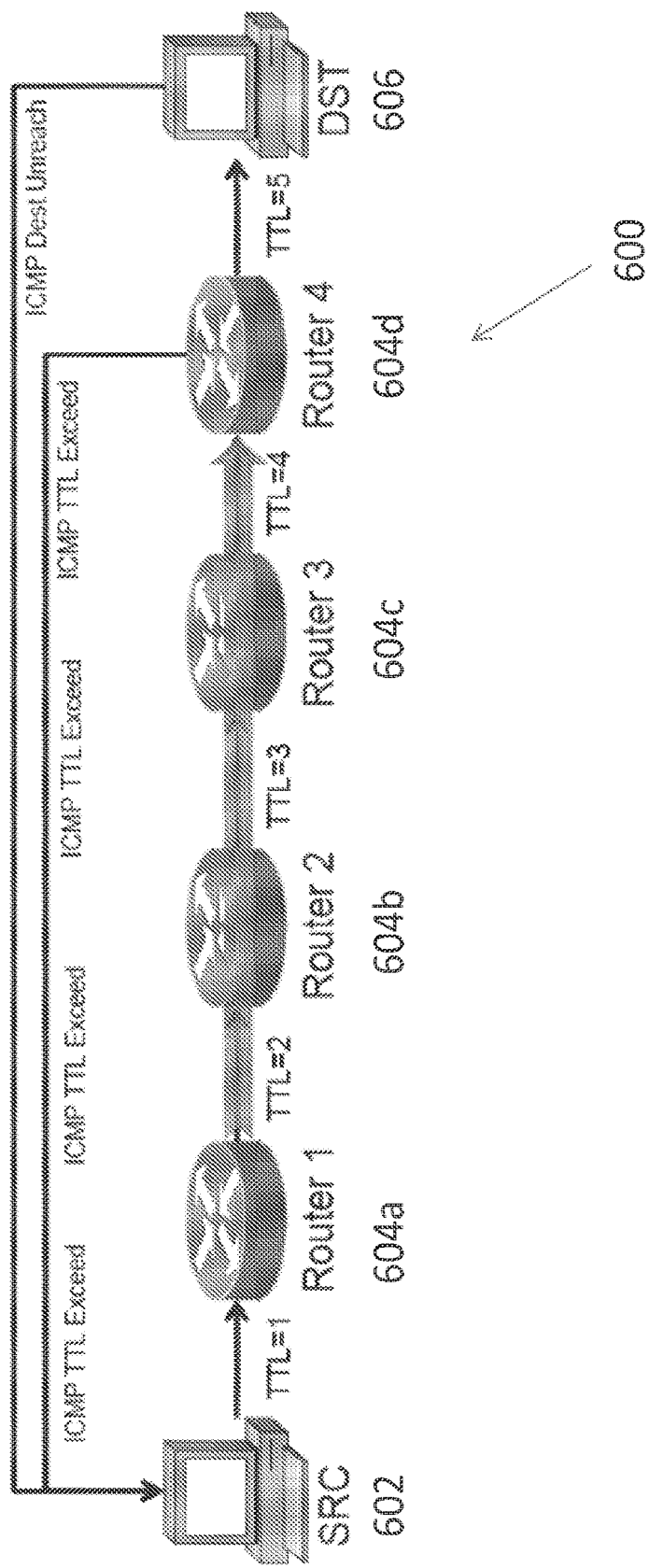
FIG. 6A illustrates routing via a multiprotocol label switching (MPLS) tunnel.

To understand how MPLS labels can be used to associate different IP addresses with the same device, consider an MPLS tunnel 600 as shown in FIG. 6A. The MPLS tunnel 600 includes several label switch routers (LSRs) 604a-604c (collectively, LSRs 604) coupled between an ingress label edge router (LER) 602, also called an edge LSR, and an egress LER 606. When the ingress LER 602 receives a packet, it determines the packet's forwarding equivalence class (FEC) and its Label Switching Path (LSP), creates an MPLS header for the packet, and inserts appropriate labels into the MPLS header before transmitting the packet to the first LSR 604a in the MPLS tunnel 600. The labels in the MPLS header specify the nodes in the MPLS tunnel 600 between the ingress and the egress (in this example, LSRs 604).

Upon receiving the packet, the first LSR 604a examines the label in the packet's MPLS header to determine the packet's destination. Unlike other routers, however, the first LSR 604a does not necessarily have any IP routing information. Instead, it simply examines the label in the packet's MPLS header to determine the packet's next destination within the MPLS tunnel 600 (here, the second LSR 604b). The first LSR 604a updates the MPLS header, then transmits the packet to LSR 604b, and so on until the packet reaches the egress LER 606, which has a full IP routing table and routes the packet appropriately.

Because the LSRs 604 perform using specific MPLS label information instead of a full IP routing table, they can route traffic relatively quickly. But because they rely on MPLS labels instead of IP routing information, the LSRs 604 cannot necessarily route traffic to destinations outside the MPLS tunnel 600. This means that if the first LSR 604a receives a packet from the ingress LER 602 with a TTL=1, it will forward the packet to the second LSR 604b instead of returning a "Time Exceeded" message to the ingress LER 602. The second LSR 604b will forward the packet to the third LSR 604c, which in turn forwards the packet to the egress LER 606, which returns a "Time Exceeded" message to the ingress LER 602. The same thing happens if the ingress LER 602 transmits packets with TTLs of 2 and 3 to the second LSR 604*b* and the third LSR 604*c*, respectively: they get forwarded to the egress LER 606, which returns a "Time Exceeded" message to the ingress LER 602. The egress LER 606 also (correctly) returns a "Time Exceeded" message in response to receiving a packet with TTL-4. As a result, the reported timing to reach intermediate hops is actually relative to LER 606, although this actual end point is unseen until the TTL reaches 4. Given the prevalence of MPLS tunnels on the Internet, finding MPLS tunnels and then ignoring intermediate hop latencies in MPLS tunnel provides a dramatic advantage for using latencies in geolocation.

FIG. 6B illustrates a process 600 for using MPLS labels in traceroute data to estimate the geographic location of a particular router. Given a trace through a known MPLS domain, the geolocation server determines the FEC used by the ingress LER to select the LSP (step 602). For each MPLS hop in the trace, the geolocation server maps the IP address of the MPLS hop to the MPLS label sequence at that point in the trace (step 604). The geolocation server repeats this IP address mapping over all trace path sequences through the MPLS domain over a selected timeframe (step 606). The geolocation server aggregates all IP addresses seen over each unique incoming MPLS label sequence (step 608), then estimates the geolocations of the aggregated IP addresses (step 610) using latency, rDNS information, or both.

As an example, consider the following three trace sequences, listing the IP addresses and MPLS labels encountered. The MPLS label sequence is identical in all three cases. The IP addresses underlined below belong to the same router and are identified by the label sequence (1314, 1496, 1793). The IP addresses in italics below belong to a different common router and are identified by the label sequence (1314, 1496, 1793, 1807, 1609). A geolocation server can identify any MPLS IP addresses seen across multiple trace sequences through the same MPLS domain that share a common label sequence as belonging to the same router. Because MPLS IP addresses belong to the same router, they have the same geographic location.

| Trace Fragment #1 | | Trace Fragment #2 | | Trace Fragment #3 | |
| --- | --- | --- | --- | --- | --- |
| IP address | MPLS Label | IP address | MPLS Label | IP address | MPLS Label |
| 4.69.143.238 | 1314 | 4.69.143.238 | 1314 | 4.69.143.238 | 1314 |
| 4.69.161.114 | 1496 | 4.69.161.114 | 1496 | 4.69.161.114 | 1496 |
| 4.69.137.58 | 1793 | 4.69.137.50 | 1793 | 4.69.137.54 | 1793 |
| 4.69.134.154 | 1807 | 4.69.134.154 | 1807 | 4.69.134.154 | 1807 |
| *4.69.134.129* | 1609 | *4.69.134.137* | 1609 | *4.69.134.141* | 1609 |

Using the above techniques, the geolocation server collects sets of IP addresses for which there is strong evidence that they belong to a single piece of equipment and hence, are in a single geographic location. The geolocation server then attempts to geolocate each set to a common location or set of locations using latency and/or DNS information.

For the IP alias sets found through a Mercator subprocess, the IP addresses themselves are generally directly probable. The geolocation server pings the members of a given set from multiple locations to find the closest collectors and computes a set of plausible geographic locations based on latency measurements.

In some implementations, the geolocation server uses triangulation techniques from the closest collectors. The geolocation server reverse resolve all IPs in each set, looking for airport codes, city names or other geographic abbreviations. Intersecting the set of locations from DNS information with the set of locations from latency measurements can provide a smaller set of potential geolocations. If that set is empty, the DNS information (which is human entered and subject to error) is ignored by the geolocation server. The end result for each set of IP aliases is a set of plausible geolocations that are consistent with all observed latency measurements and, where possible, consistent with geographic "hints" derived from DNS labels.

For IP alias sets found via MPLS labels, the IP addresses themselves are not necessarily directly probable and may be observable only in transit to other destinations via traceroutes. Also, latency information observed in such traceroute measurements may not be used for intermediate hops of an MPLS tunnel, as the timings may be relative to the end of the tunnel. Thus, in general, for any latency measurements derived from traceroutes, the geolocation server may discard latencies that come from intermediate hops in an MPLS tunnel, which can be identified by the geolocation server via the use of MPLS labels as described above. In instances when probing directly or getting accurate latency information indirectly is not feasible, the geolocation server may revert to DNS labels to geolocate IP aliases belonging to MPLS tunnels.

Figure 7B:
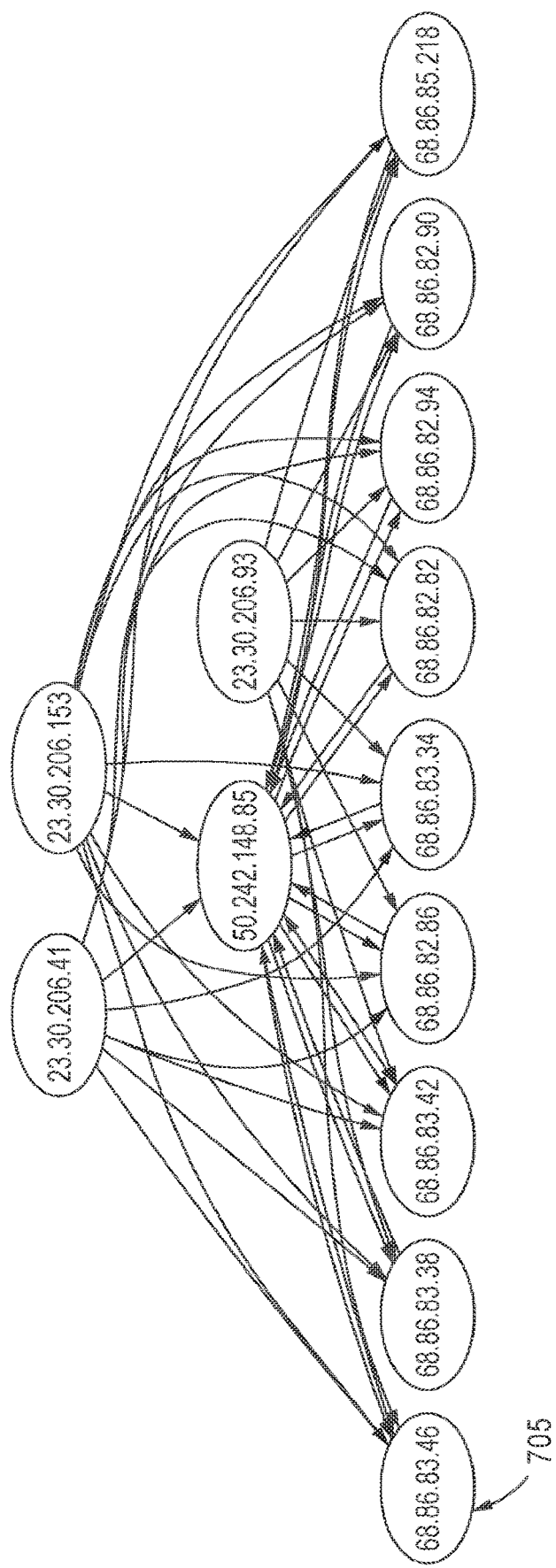
FIG. 7B shows a graph representation of aliased IP addresses identified and geolocated using the process of FIG. 7A.

FIGS. 7A and 7B illustrate an example of IP de-aliasing technique utilized by a geolocation server and process. An example of the Mercator technique utilized by the geolocation server to identify IP addresses on a common router and then improve the geolocation estimate of the entire set is provided below. The following 12 IP addresses were identified as a related set of IP aliases:

68.86.83.46, 68.86.83.42, 68.86.83.38, 68.86.83.34, 68.86.82.94, 50.242.148.85, 68.86.82.82, 68.86.85.218, 68.86.82.86, 68.86.82.90, 23.30.206.41, 23.30.206.153

The geolocation server identifies this set by finding connected components in a graph using the process 700 shown in FIG. 7A. Namely, if a Mercator probe to IP address A returns IP address B, then IP addresses A and B can be associated with each other. Such an association can be depicted in graph-theoretic terms as two nodes, one each for A and B, with a directed edge between them. If A is an alias for B and B is an alias for C, then A, B, and C are aliases for each other.

Put differently, the process 700 includes sending arbitrary packets (e.g., Transmission Control Protocol or User Datagram Protocol packets) from sensors to random ports of selected IP addresses, which may represent router interfaces. The sensors measure round-trip latencies and watch for port unreachable messages (step 704). If the sensor receives a port unreachable message, the sensor or the geolocation server determines if the port unreachable messages was returned from an IP address that is different than the destination of the arbitrary packet (step 706). If so, the geolocation server determines that the destination IP address has one or more IP aliases, including the IP address that returned the port unreachable message (step 708). Then the geolocation server determines that all of the IP aliases are at the same geographic location (step 710) and estimates their geographic location using the techniques described above.

The 12 IP addresses given above and their learned associations can be represented by the connected graph shown in FIG. 7B, which indicates that they are all related. FIG. 7B shows that 7 out of 12 of these IP addresses form a strongly connected subgraph, implying each IP address is "seen" both directions. That is, probing A returns at least one member of the component, while probing one or more members of the component also returns A. (Strongly connected components provide very strong evidence of aliasing, although for our purposes we just required connected components.)

Based on the above connectivity, the geolocation server can infer which IPs belong to a same device and should thus, be located in the same geographic location. Latency measurements indicate that all of these IP addresses are near San Jose, Calif. DNS information for all of these IP addresses point to the Great Oaks neighborhood of San Jose. For example, 68.86.83.46 node 705 in FIG. 7 resolves to be-17-pe02. 11greatoaks.ca.ibone.comcast.net. Based on automated analysis performed by the geolocation server, all 12 IP address are in Great Oaks, San Jose, Calif. in the USA.

At the time of this writing, three commercial IP geolocation providers gave the following geolocation estimates for these 12 IP addresses:

Provider 1: US, no cities specified
Provider 2: Several US cities including Ashburn, Va., Marietta, Ga., Denver, Colo., and Los Angeles, Calif.
Provider 3: Several US cities including Seattle, Wash., Denver, Colo., Dallas, Tex., and Marietta, Ga.

This is fairly typical of commercially available IP geolocation data. It is rare to find commercial geolocation providers placing all aliases in the same location and it is not unusual (especially for routers with international connectivity) to see aliases placed in different countries.

Transit Tree

In some implementations, the geolocation server can identify incorrect geolocations at a country-level for subsequent correction and refinement using latencies and DNS resolution. To effect this, the geolocation server performs analytics derived from BGP routing data from multiple (e.g., over 600) peering sessions. The geolocation server receives BGP data containing information about Autonomous System (AS) paths to each routed network prefix on the Internet from BGP data collectors. Each AS path contains AS-AS edges, representing adjacent autonomous systems that exchange routes and maintain some sort of business relationship.

Figure 8A:
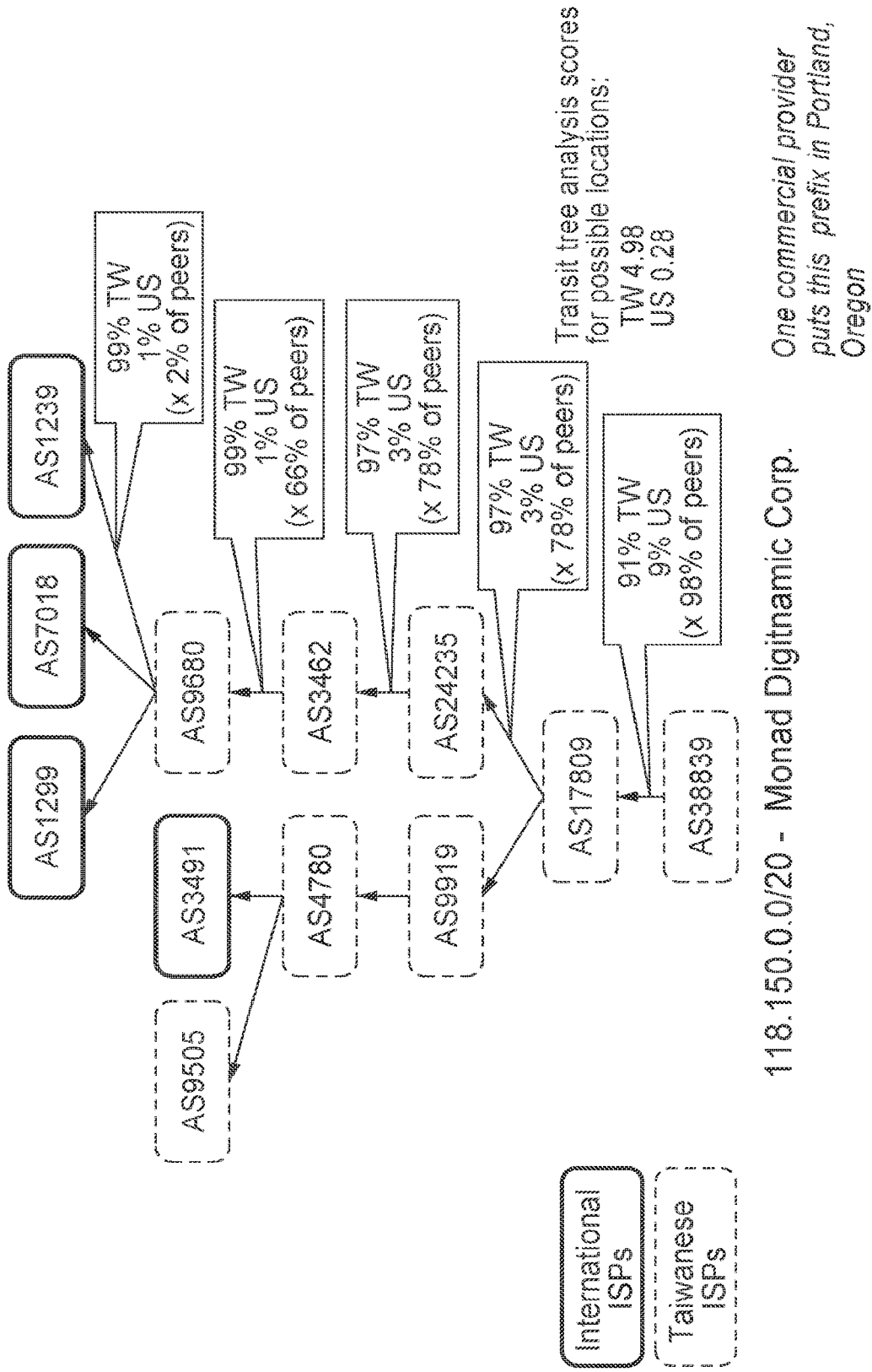
FIG. 8A illustrates a transit tree showing a collection of network prefixes transited from its origin out to the core of the Internet generated by a geolocation server.

FIG. 8A illustrates a single network prefix transited from its origin out to the core of the Internet, generated by a geolocation server. In some implementations, the geolocation server employs a machine-learning classifier to classify these AS edges into one of several different categories (tags): transit, peering, cluster, exchange, and the like. Local or regional transit providers can be expected to operate in a limited geography and hence transit network prefixes geolocating to their countries of operation. The generated BGP edge tags are thereafter utilized by the geolocation server to determine how each network prefix is transited from its origin out to the core of the Internet, e.g., the transit tree shown in FIG. 8A.

FIG. 8B illustrates a process 800 for determining the likely geolocation of the prefix in question based on the presumed geolocation of other prefixes carried on the same transit edges. In step 802, the geolocation server computes the transit tree for the prefix in question based on generated edge tags. Next, the geolocation server examines the geolocations of some or all prefixes carried on the transit tree's edges (step 804). For each edge that a prefix is observed transiting, the geolocation server computes a geographic distribution of all prefixes across the edge and weights the geographic distribution based on the number BGP peers observing the prefix in question across that edge (step 806). The geolocation server combines these weighted geographic distributions into a suggested country-level geolocation (where possible) for the prefix in question (step 808). The geolocation server compares the geolocation inferred from the transit tree to geolocation(s) reported by one or more third parties of the prefix under examination in step 810. (The geolocation server may obtain the reported geolocation automatically, e.g., as described above.) If the inferred geolocation does not match the reported geolocation(s), the geolocation server verifies the geolocation of the prefix with latency measurements (step 812), e.g., using the techniques described above.

An example utility of the transit tree in FIG. 8A is illustrated with respect to the prefix 118.150.0.0/20, geolocated by one major commercial provider to Portland, Oreg. Examining the transit tree for this prefix shows that the transit edges largely carry prefixes that this provider geolocates to Taiwan and that most of the BGP peers observe these edges, especially those closest to the origin of the prefix. The scoring performed by the geolocation server indicates that the most likely geolocation for this prefix is in fact Taiwan, with the US coming in a distant second. Latency measurements confirm the likelihood of this prefix residing in Taiwan and the complete implausibility of it being located in the US.

Routing Events Correlated in Time

In some implementations, the geolocation service can identify incorrect geolocations for subsequent correction and refinement by using historical BGP outage and instability data. To this effect, the geolocation server performs outage and instability calculations for some or all of the routed prefixes on the Internet, derived from BGP routing data from multiple (e.g., over 600) peering sessions, and identifies "events" as sets of prefixes exhibiting certain behaviors around the same time. The correlation of these events over time often reveals commonalities in networking infrastructure and routing paths for those prefixes.

These computed events often represent large network outages and restorations in specific geographic locations. For example, the geolocation server observed an event where 121 prefixes were withdrawn at the same time—96% of those prefixes were geolocated to India by a commercial service. Fifteen minutes later on the same day, the geolocation server saw almost all of these prefixes return. Since this pair of events contained 99 prefixes in common, it is likely they capture the failure and restoration of the same physical infrastructure. The fact that almost all of them were geolocated to India adds support to this explanation.

By analyzing the few prefixes not located in India, the geolocation server was able to generate a candidate set of potential misgeolocations. The chance of a prefix being withdrawn and restored at exactly these times and not involved in the same network outage is very low, but not zero, and hence their geolocation requires validation.

For example, 198.40.150.0/24, registered to Modine Manufacturing Company in Racine, Wis. US, was one such prefix. In 2011, all available commercial services placed this prefix in India and most still do. The geolocation server observed 198.40.150.0/24 being announced from AS21758 (Modine Manufacturing Company) and transited exclusively via AS18101 (Reliance Communications Mumbai). AS18101 has a footprint exclusively India, with many prefixes in Mumbai and Chennai. It would be very surprising to find that they were also providing Internet service in the Racine, Wis. area where Modine is based. Registry from ARIN lists this prefix in Racine, Wis., which is undoubtedly the source of these common misgeolocations.

Latency data suggests this prefix is in Chennai, India. This is not surprising as Modine announced a new manufacturing facility in Chennai, India in December 2008 via a press release. It is not uncommon for prefixes of satellite offices to be registered at the physical address of headquarters. The geolocation server was able to place this prefix in Chennai after discovering the potential misgeolocation from a cluster of BGP routing outages and restorations correlated in time and then verifying the new geolocation via latency data. While latency data alone would have been sufficient for identifying such a level of misgeolocation, BGP routing events can help refine and correct misgeolocations on a smaller geographic scale, especially for nearby cities where latencies alone are inconclusive.

Figure 9:
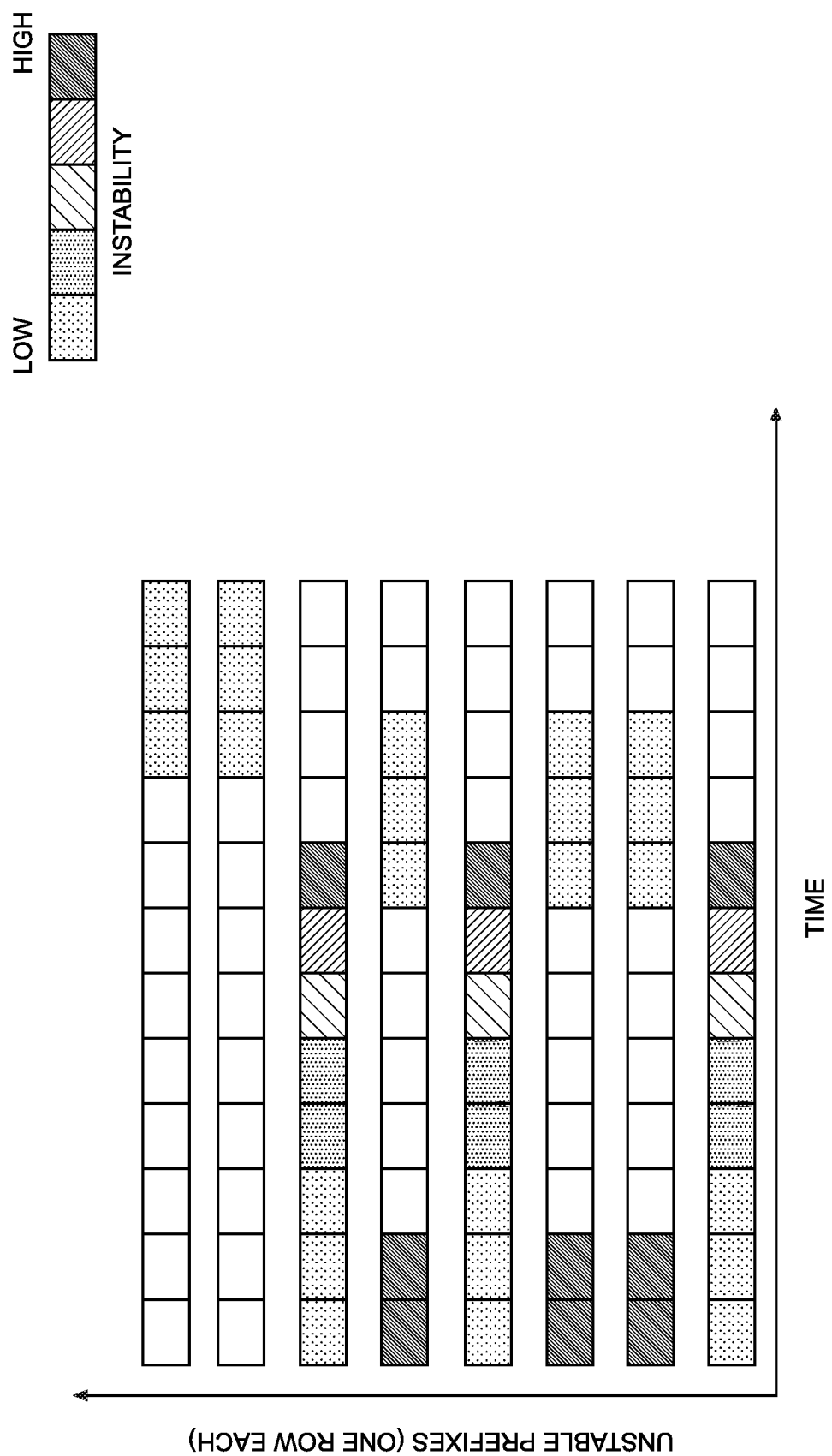
FIG. 9 illustrates Border Gateway Protocol (BGP) routing stability over time for a set of network prefixes geolocating to a single region.

FIG. 9 illustrates a collection of network prefixes during a short period of regional Internet instability. Time is denoted along the x-axis and each prefix of interest is shown along each "row" of the y-axis. Notice that patterns clearly emerge, which allow prefixes displaying a common instability pattern to be algorithmically clustered. The geolocation server looks for geo-inconsistencies within such clusters and uses the techniques described above to validate or invalidate any anomalies.

Distance from Anycast Instances

In some implementations, the geolocation service can identify incorrect geolocations for subsequent correction and refinement using the geographic distribution of IP addresses observed querying a global anycast network. The system may include a widely distributed global anycast network for providing authoritative DNS responses as part of a commercial DNS service, providing answers to tens of millions of recursives worldwide. By observing the geographic distribution of recursives querying each instance of the anycast network, geographic outliers can be discovered and investigated further by the techniques described here for possible correction. In addition, like rDNS, the geolocation of an anycast instance is a weak identifier of the locations of the queriers to that instance. That is, well-designed anycast networks tend to keep queries local.

Parametric Path Fitting

In some implementations, the geolocation service can identify incorrect geolocations for subsequent correction and refinement using the geographic distribution of IP addresses observed downstream of traceroute edges. Each traceroute consists of a sequence of consecutive IP addresses observed along a path from a traceroute collector to a destination IP address. Each pair of consecutive IP addresses along such a path can be viewed as a directed edge in graph theoretic terms. For each such edge or sequence of consecutive edges, the geolocation server computes the set of IP address observed downstream of the edges for all traceroutes that traverse the given path fragment, building a model of what the latencies and hops typically look like in the data. The geolocation server then looks for geographic outliers in each set of downstream IP addresses associated with each such directed path fragment. These outliers can be investigated further by the techniques described here for possible correction.

Non-Geolocatable IP Address

In some implementations, the geolocation server identifies IP addresses that cannot be geolocated with any reasonable degree of specificity (e.g., other than "Earth" or a very large area, such as a continent). There are several reasons for this lack of specificity. The IP address may belong to a mobile device, and hence, is free to roam. The IP address may be at the other end of a satellite link. Satellites are typically in geosynchronous orbit (thereby implying latencies of over 500 ms RTT) and have wide beams covering large geographic areas. Latencies can be used to identify satellite connections but the actual location of the IP could be anywhere within the satellite's beam.

In addition, IP addresses can be anycast, that is, announced from multiple locations via BGP routing. In such a case, these P addresses have no single geolocation as they are simultaneously in many different locations. Anycast routing techniques are often used by content providers to decrease latencies to end users from a replicated store of popular content. As noted earlier, IP addresses identified by the geolocation server to be geo-inconsistent by latency measurements are tagged as anycast.

Geolocation providers typically place each P address they include in their databases in a single geographic location. This strategy can be misleading for anycast networks. For example, consider Google's popular public DNS recursive resolver at 8.8.8.8. Using the same commercial providers used in an earlier example, the geolocation server outputs the following geolocations:

Provider 1: Mountain View, Calif., USA
Provider 2: Mountain View, Calif., USA
Provider 3: Mountain View, Calif., USA The geolocation server determines that the Google DNS 8.8.8.8 is within 5 ms of 110 of the traceroute data collectors and is geo-inconsistent between 26,704 different pairs of collectors, implying a high-degree of anycasting (i.e., many actual Google locations). However, the geolocation server measurements indicate that none of these many Google instances of 8.8.8.8 are actually in Mountain View, a conclusion supported by Googles own publically released information. Not only can the geolocation server find anycast prefixes using latency measurements, it can also identify likely locations of each anycasted instance.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" an: used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory computer readable medium comprising instructions which, when executed by one or more hardware processors, causes performance of operations comprising:
    identifying a transit edge used for transmitting a first set of one or more packets addressed to a target network prefix;

identifying a first set of destination network prefixes for a second set of packets transmitted over the same transit edge;

determining a first plurality of geolocations associated respectively with the first set of destination network prefixes;

for each particular destination network prefix of the first set of destination network prefixes:

determining a weight associated with the particular destination network prefix based on a subset of the second set of packets transmitted to the particular destination network prefix;

estimating a geolocation, associated with a device corresponding to the target network prefix, based on (a) the first plurality of geolocations associated respectively with the first set of destination network prefixes, and (b) the weight associated with each particular destination network prefix of the first set of destination network prefixes.

2. The medium of claim 1, wherein the operations further comprise:

identifying a plurality of transit edges used for transmitting the first set of one or more packets addressed to the target network prefix;

identifying a second set of destination network prefixes for a third set of packets transmitted over at least one of the plurality of transit edges;

determining a second plurality of geolocations associated respectively with the second set of destination network prefixes;

wherein the geolocation, associated with the device corresponding to the target network prefix, is estimated based further on the second plurality of geolocations associated respectively with the second set of destination network prefixes.

3. The medium of claim 1, wherein determining the weight associated with the particular destination network prefix further comprises:

determining the weight associated with each particular destination network prefix of the first set of destination network prefixes based on a number of BGP peers observing packets transmitted over the transit edge that are addressed to the particular destination network prefix.

4. The medium of claim 1, wherein the operations further comprise:

responsive to determining the estimated geolocation for the device does not match a second geolocation for the device reported by one or more third parties:

verifying the estimated geolocation for the device with latency measurements based on communication with the device.

5. The medium of claim 1, wherein the transit edge is a directed edge defined by a consecutive set of nodes on a path for the first set of one or more packets addressed to the target network prefix.

6. The medium of claim 1, wherein the transit edge is tagged with a transit tag by a machine-learning classifier, wherein the transit edge is selected for estimating the geolocation based on the transit tag.

7. The medium of claim 1, wherein the estimated geolocation is a country-level geolocation.

8. A method comprising:

identifying a transit edge used for transmitting a first set of one or more packets addressed to a target network prefix;

identifying a first set of destination network prefixes for a second set of packets transmitted over the same transit edge;

determining a first plurality of geolocations associated respectively with the first set of destination network prefixes;

for each particular destination network prefix of the first set of destination network prefixes:

determining a weight associated with the particular destination network prefix based on a subset of the second set of packets transmitted to the particular destination network prefix;

estimating a geolocation, associated with a device corresponding to the target network prefix, based on (a) the first plurality of geolocations associated respectively with the first set of destination network prefixes, and (b) the weight associated with each particular destination network prefix of the first set of destination network prefixes, wherein the method is executed by at least one device including a hardware processor.

9. The method of claim 8, wherein the operations further comprise:

identifying a plurality of transit edges used for transmitting the first set of one or more packets addressed to the target network prefix;

identifying a second set of destination network prefixes for a third set of packets transmitted over at least one of the plurality of transit edges;

determining a second plurality of geolocations associated respectively with the second set of destination network prefixes;

wherein the geolocation, associated with the device corresponding to the target network prefix, is estimated based further on the second plurality of geolocations associated respectively with the second set of destination network prefixes.

10. The method of claim 8, wherein determining the weight associated with the particular destination network prefix further comprises:

determining the weight associated with each particular destination network prefix of the first set of destination network prefixes based on a number of BGP peers observing packets transmitted over the transit edge that are addressed to the particular destination network prefix.

11. The method of claim 8, wherein the operations further comprise:

responsive to determining the estimated geolocation for the device does not match a second geolocation for the device reported by one or more third parties:

verifying the estimated geolocation for the device with latency measurements based on communication with the device.

12. The method of claim 8, wherein the transit edge is a directed edge defined by a consecutive set of nodes on a path for the first set of one or more packets addressed to the target network prefix.

13. The method of claim 8, wherein the transit edge is tagged with a transit tag by a machine-learning classifier, wherein the transit edge is selected for estimating the geolocation based on the transit tag.

14. The method of claim 8, wherein the estimated geolocation is a country-level geolocation.

15. A system comprising:

at least one hardware processor;

the system being configured to execute operations comprising:

identifying a transit edge used for transmitting a first set of one or more packets addressed to a target network prefix;

identifying a first set of destination network prefixes for a second set of packets transmitted over the same transit edge;

determining a first plurality of geolocations associated respectively with the first set of destination network prefixes;

for each particular destination network prefix of the first set of destination network prefixes:

determining a weight associated with the particular destination network prefix based on a subset of the second set of packets transmitted to the particular destination network prefix;

estimating a geolocation, associated with a device corresponding to the target network prefix, based on (a) the first plurality of geolocations associated respectively with the first set of destination network prefixes, and (b) the weight associated with each particular destination network prefix of the first set of destination network prefixes.

16. The system of claim 15, wherein the operations further comprise:

identifying a plurality of transit edges used for transmitting the first set of one or more packets addressed to the target network prefix;

identifying a second set of destination network prefixes for a third set of packets transmitted over at least one of the plurality of transit edges;

determining a second plurality of geolocations associated respectively with the second set of destination network prefixes;

wherein the geolocation, associated with the device corresponding to the target network prefix, is estimated based further on the second plurality of geolocations associated respectively with the second set of destination network prefixes.

17. The system of claim 15, wherein determining the weight associated with the particular destination network prefix further comprises:

determining the weight associated with each particular destination network prefix of the first set of destination network prefixes based on a number of BGP peers observing packets transmitted over the transit edge that are addressed to the particular destination network prefix.

18. The system of claim 15, wherein the operations further comprise:

responsive to determining the estimated geolocation for the device does not match a second geolocation for the device reported by one or more third parties:

verifying the estimated geolocation for the device with latency measurements based on communication with the device.

19. The system of claim 15, wherein the transit edge is a directed edge defined by a consecutive set of nodes on a path for the first set of one or more packets addressed to the target network prefix.

20. The system of claim 15, wherein the transit edge is tagged with a transit tag by a machine-learning classifier, wherein the transit edge is selected for estimating the geolocation based on the transit tag.

\* \* \* \* \*